US012631721B2

(12) United States Patent
Song et al.

(10) Patent No.: US 12,631,721 B2
(45) Date of Patent: May 19, 2026

(54) METHOD FOR CONTROLLING RADAR FREQUENCY HOPPING, APPARATUS, RADAR SPEED MEASUREMENT METHOD, AND RADAR

(71) Applicant: Shenzhen Yinwang Intelligent Technologies Co., Ltd., Shenzhen (CN)

(72) Inventors: Sida Song, Beijing (CN); Sha Ma, Beijing (CN); Lei Gao, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 663 days.

(21) Appl. No.: 17/970,949

(22) Filed: Oct. 21, 2022

(65) Prior Publication Data

US 2023/0053033 A1     Feb. 16, 2023

Related U.S. Application Data

(63) Continuation of application No. PCT/CN2020/086408, filed on Apr. 23, 2020.

(51) Int. Cl.
| | |
|---|---|
| *G01S 7/02* | (2006.01) |
| *G01S 7/36* | (2006.01) |
| *H04B 1/713* | (2011.01) |

(52) U.S. Cl.
CPC .............. *G01S 7/0232* (2021.05); *G01S 7/36* (2013.01); *H04B 1/713* (2013.01)

(58) Field of Classification Search
CPC ...... G01S 13/931; G01S 13/343; G01S 7/023; G01S 7/0232; G01S 7/0235; G01S 13/584; G01S 13/347; G01S 7/356; G01S 7/35; G01S 13/345; G01S 7/352; G01S 13/42; G01S 7/021; G01S 7/354; G01S 13/346; G01S 7/003; G01S 7/2883; G01S 2013/9316; G01S 7/36; G01S 7/40; G01S 13/34; G01S 13/38; G01S 13/536; G01S 7/4056; G01S 13/56

See application file for complete search history.

(56) References Cited

U.S. PATENT DOCUMENTS

| | | | |
|---|---|---|---|
| 4,309,703 | A | 1/1982 | Blahut |
| 6,553,447 | B1 | 4/2003 | Arimilli et al. |

(Continued)

FOREIGN PATENT DOCUMENTS

| | | |
|---|---|---|
| CN | 1740815 A | 3/2006 |
| CN | 101089653 A | 12/2007 |

(Continued)

OTHER PUBLICATIONS

Yijiang Pan et al.,"A Novel Low Probability Intercept Radar Altimeter Based on FMCW and Frequency Hopping Hybrid Modulation", 2013 IEEE, 5 pages.

(Continued)

*Primary Examiner* — Golam Sorowar
(74) *Attorney, Agent, or Firm* — Conley Rose, P.C.

(57) ABSTRACT

A method for controlling radar frequency hopping includes determining start frequencies of a plurality of frequency modulated continuous wave (FMCWs) based on a first function, and controlling a radar to sequentially transmit the plurality of FMCWs by performing frequency hopping based on the determined start frequencies.

20 Claims, 11 Drawing Sheets

Detection radar (radar 1)

Target

Interference radar (radar 2)

(56)                 References Cited

U.S. PATENT DOCUMENTS

| | | | |
|---|---|---|---|
| 9,395,435 B2 | 7/2016 | Kuo et al. | |
| 2005/0104765 A1 | 5/2005 | Bandhauer | |
| 2006/0181448 A1* | 8/2006 | Natsume | G01S 7/36 |
| | | | 342/111 |
| 2008/0122680 A1 | 5/2008 | Morinaga et al. | |
| 2014/0354470 A1 | 12/2014 | Kuo et al. | |
| 2015/0378016 A1 | 12/2015 | Schoor | |
| 2018/0003799 A1 | 1/2018 | Yang et al. | |
| 2020/0005030 A1 | 1/2020 | Lee | |
| 2020/0124699 A1* | 4/2020 | Meissner | G01S 13/0209 |
| 2020/0191911 A1* | 6/2020 | Meissner | G01S 13/343 |
| 2020/0393536 A1* | 12/2020 | Stettiner | G01S 13/343 |
| 2021/0156980 A1* | 5/2021 | Stettiner | G01S 7/2883 |
| 2021/0156982 A1* | 5/2021 | Stettiner | G01S 7/35 |
| 2021/0190905 A1* | 6/2021 | Roger | G01S 13/536 |

FOREIGN PATENT DOCUMENTS

| | | |
|---|---|---|
| CN | 101980046 A | 2/2011 |
| CN | 103138799 A | 6/2013 |
| CN | 103983953 A | 8/2014 |
| CN | 105301591 A | 2/2016 |
| CN | 105337636 A | 2/2016 |
| CN | 108627807 A | 10/2018 |
| CN | 108776329 A | 11/2018 |
| CN | 109061589 A | 12/2018 |
| CN | 109164421 A | 1/2019 |
| CN | 109196375 A | 1/2019 |
| EP | 1634095 B1 | 9/2008 |
| JP | 2019056670 A | 4/2019 |
| WO | 2019106656 A1 | 6/2019 |
| WO | 2019215734 A1 | 11/2019 |

OTHER PUBLICATIONS

Gui Renzhou,"Application of Hopping Frequency Techniques to High Frequency Ground Wave Radar", Journal of Tongji University( Natu ral Science), vol. 36 No. 7, Jul. 2008, with an English abstract, 6 pages.
Sida Song et al.,"Cooperative Automotive Radar System for Inter-Radar Interference Avoidance", 2019 International Radar Conference (Radar2019), 6 pages.
Liu Xu et al.,"Phase compensation of band passes filters in frequency hopping signal", 1008-0570(2009)04-3-0110-02, Microcomputer Information, 2009, with an English abstract, 3 pages.
Huang Jian,"Target Formation Detection Based on the Virtual Hopping Method on HF Radar", Journal of Wuhan University(Natural Science Edition), vol. 58, No. 2, Apr. 2012, with an English abstract, 4 pages.
Mahdi Nouri et al.,"Target recognition and discrimination based on multiple-frequencies LFM signal with subcarrier hopping", Jan. 2019, Multidimensional Systems and Signal Processing 30(1), DOI:10.1007/s11045-017-0547-z, 23 pages.

\* cited by examiner

——————— Transmitted signal of a radar 1

— — — — — Echo corresponding to a maximum ranging distance of the radar 1

— ·· — ·· — · Transmitted signal of a radar 2

············· Interference signal of the radar 2 that arrives at the radar 1

///////// Interference intermediate frequency area

| | Transmitted signal of a radar 1 |
|---|---|
| | Echo corresponding to a maximum ranging distance of the radar 1 |
| | Transmitted signal of a radar 2 |
| | Interference signal of the radar 2 that arrives at the radar 1 |
| | Interference intermediate frequency area |

611
612
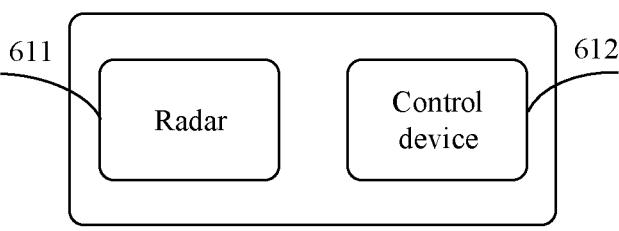
FIG. 6A
621
Determine start frequencies of a plurality of frequency modulated continuous waves based on a first function
622
Control a radar to sequentially transmit the plurality of frequency modulated continuous waves by performing frequency hopping based on the determined start frequencies
FIG. 6B
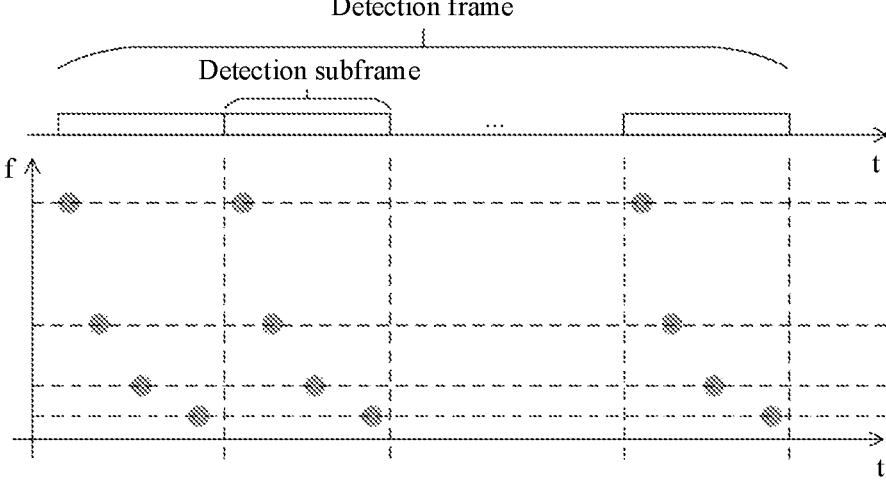
FIG. 6C

8201

Perform fast Fourier transform on echo intermediate frequency signals corresponding to $M$ frequency modulated continuous waves included in at least one detection subframe to obtain a first speed parameter

8202

Perform fast Fourier transform on echo intermediate frequency signals corresponding to at least one group of $N$ frequency modulated continuous waves in the detection frame that have a same start frequency to obtain a second speed parameter

8203

Calculate a relative speed of a target based on the first speed parameter and the second speed parameter

FIG. 8B

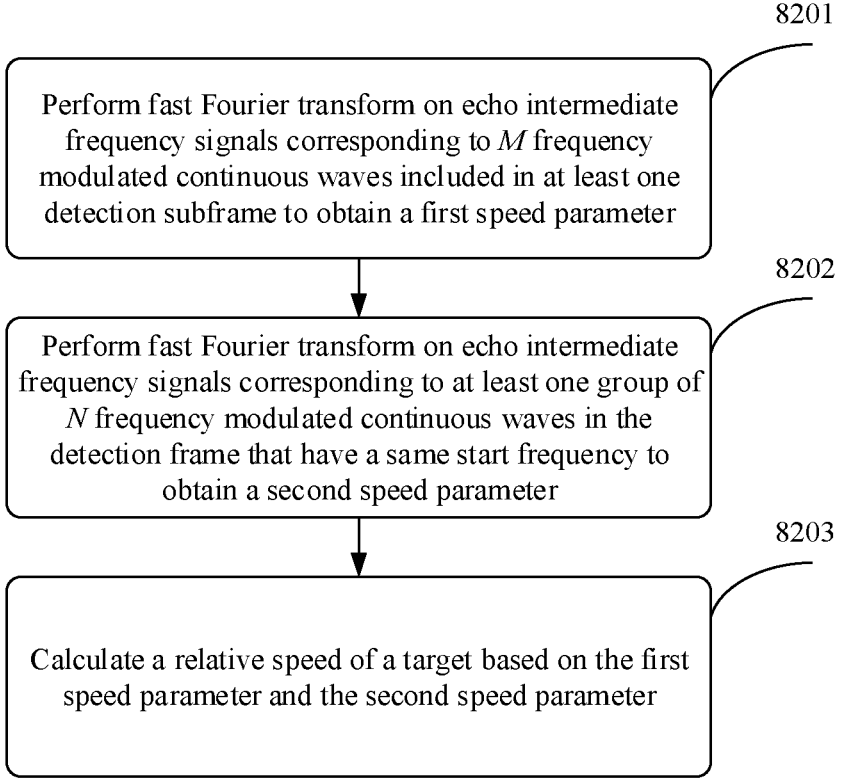

910

930

920

Radar 900

Radar frequency hopping apparatus

Signal receiving module

Calculation module

FIG. 9A

METHOD FOR CONTROLLING RADAR FREQUENCY HOPPING, APPARATUS, RADAR SPEED MEASUREMENT METHOD, AND RADAR

CROSS-REFERENCE TO RELATED APPLICATIONS

This application is a continuation of International Patent Application No. PCT/CN2020/086408, filed on Apr. 23, 2020, the disclosure of which is hereby incorporated by reference in its entirety.

TECHNICAL FIELD

The present disclosure relates to the field of radar measurement technologies, and in particular, to a method for controlling radar frequency hopping, a radar frequency hopping apparatus, a radar speed measurement method, a radar, a chip, a computer program, and a readable storage medium.

BACKGROUND

With development of society, intelligent vehicles are gradually entering people's daily life. A sensor plays a quite important role in assistant driving and automatic driving of the intelligent vehicle. In a driving process of a vehicle, various sensors, such as a millimeter wave radar, a laser radar, a camera, and an ultrasonic radar, installed on the vehicle sense a surrounding environment at any time, collect data, identify and track a moving object, identify a static scenario such as a lane line or a signboard, and perform path planning in conjunction with a navigator and map data. The sensor can detect a possible danger in advance and help, in a timely manner, a driver take a necessary avoidance measure, thereby effectively improving safety and comfort during vehicle driving.

A millimeter wave is an electromagnetic wave with a wavelength between 1 mm to 10 mm, and a frequency range corresponding to the millimeter wave is generally 30 GHz to 300 GHz. Within this frequency band, a millimeter wave radar has characteristics of a large bandwidth, a short wavelength, and a high radar resolution. In addition, compared with a laser radar and an optical system, the millimeter wave radar is more capable of penetrating smoke, dust, and fog, and can implement all-weather operation. Based on the foregoing characteristics, the millimeter wave radar is more applicable to the vehicle field than another sensor.

As shown in FIG. 1, a commonly used in-vehicle millimeter wave radar system in the market usually includes apparatuses such as an oscillator, a transmit antenna, a receive antenna, a mixer, a processor, and a controller. An operating principle of the in-vehicle millimeter wave radar system is: The oscillator generates a signal whose frequency increases linearly with time (frequency-modulated continuous wave (FMCW)). One part of the signal is output to the mixer as a local oscillator signal through a directional coupler, and the other part of the signal is transmitted outward by the transmit antenna. The receive antenna receives a millimeter wave signal reflected back by an object in front of a vehicle. The mixer performs frequency mixing on the millimeter wave signal and the local oscillator signal to obtain an IF signal (including information about a target object, for example, a relative distance, a speed, and an angle), and the IF signal is sent to the processor after being processed by a low-pass filter and being amplified. The processor processes the IF signal (usually samples a signal, performs fast Fourier transform (FFT), and performs spectral analysis) to obtain the information about the target object, for example, the relative distance, the speed, and the angle, and finally outputs a processed signal to the controller to control behavior of the vehicle.

With an increase of a penetration rate of in-vehicle radars, mutual interference between automotive radars becomes more serious, which greatly reduces a probability of radar detection or increases a ghost probability of radar detection, leading to non-negligible impact on safety or comfort. How to reduce interference between in-vehicle radars is a problem that needs to be resolved.

An existing anti-interference method for an in-vehicle radar includes a radar waveform frequency hopping technology. In the radar waveform frequency hopping technology, a radar uses another operating band after detecting, within an operating band of the radar, interference generated by another radar, to prevent interference between a plurality of radars. Generally, radars reduce a mutual interference probability through an intra-frame random frequency hopping technology.

However, although the intra-frame random frequency hopping technology can better reduce the mutual interference probability, because transmitting frequencies in the intra-frame random frequency hopping technology are randomly distributed within a specific bandwidth range without a fixed rule, an existing simple digital signal processing method, for example, FFT cannot be used to process an echo IF signal to calculate a relative speed of a target object, which leads to an increase in a calculation amount of a processor to some extent.

SUMMARY

In view of this, the present disclosure provides a method for controlling radar frequency hopping, a radar frequency hopping apparatus, a radar speed measurement method, a radar, a chip, a computer program, and a readable storage medium, to reduce a mutual interference probability of a radar and further perform speed measurement calculation by using an existing simple digital signal processing method, so that a calculation amount is reduced and application is relatively easy.

According to a first aspect, a method for controlling radar frequency hopping is provided, including: determining start frequencies of a plurality of FMCWs based on a first function; and controlling a radar to sequentially transmit the plurality of FMCWs by performing frequency hopping based on the determined start frequencies.

From the foregoing, in the present disclosure, one first function is designed, and the start frequencies of the plurality of FMCWs are determined based on the first function, to control the radar to sequentially transmit the plurality of FMCWs based on the determined start frequencies when the radar transmits signals through frequency hopping, so that frequency hopping is implemented. It should be noted that, because of a specific range of an operating bandwidth of the radar and a characteristic of the first function, a frequency difference between adjacent FMCWs becomes smaller, and therefore a quantity of the plurality of FMCWs may be usually not excessively large. Therefore, in the present disclosure, frequency hopping can be implemented to reduce a mutual interference probability of the radar. In addition, because the start frequencies of the plurality of FMCWs transmitted by the radar are determined based on the first function, in a speed measurement process, when calculation is performed on phase sequences of echo IF signals in a plurality of continuous periods at a same sampling time point, an existing simple digital signal processing method, for example, FFT, may be used to perform processing and calculation to complete speed measurement of a target object.

According to the first aspect, in a first possible implementation of the method for controlling radar frequency hopping, the first function is:

$$b_k = \beta + \frac{\alpha - \beta}{k}, k = 1,2, \ldots M,$$

and M≥2, where $b_k$ is a start frequency of the $k^{th}$ FMCW, k is a sequence number of each FMCW, $\alpha, \beta$ are frequency hopping parameters, and M is a quantity of the plurality of FMCWs.

From the foregoing, the first function is a monotone function that varies with a value of k, and a larger value of k indicates a smaller change rate of the function, to be specific, as sequence numbers of FMCWs become larger, a difference between start frequencies of two adjacent FMCWs becomes smaller. When k=1, $b_1=\alpha$, to be specific, α determines a start frequency of the first function (a start frequency of the first FMCW); and when $$k \to +\infty, b_k = \beta \left(\frac{\alpha - \beta}{+\infty} \text{ is negligible}\right),$$

to be specific, β determines an "end" frequency of the first function. Therefore, the frequency hopping parameters $\alpha, \beta$ are defined based on an operating band of the radar, to determine a start frequency of each FMCW.

According to the first aspect or the first possible implementation of the first aspect, in a second possible implementation of the method for controlling radar frequency hopping, the quantity of the plurality of FMCWs is a power of 2.

From the foregoing, because the first function is a monotone function that varies with the value of k, and a larger value of k indicates a smaller change rate of the function, to ensure that frequencies (start frequencies) of the FMCWs can "hop up" as much as possible, the quantity of the plurality of FMCWs cannot be excessively large. In addition, because a minimum calculation unit of a FFT operation is 2, when a time domain length of a waveform is a power of 2, quite effective base 2-FFT may be used to shorten a processing time. Therefore, to facilitate the operation, the quantity of FMCWs may be a power of 2.

According to the second possible implementation of the first aspect, in a third possible implementation of the method for controlling radar frequency hopping, a difference between start frequencies of any two adjacent FMCWs is greater than a first threshold, and the first threshold is determined according to a predefined or preconfigured rule.

From the foregoing, the first threshold is intended to ensure that the frequencies (start frequencies) of the FMCWs can "hop up" as much as possible. A value of the first threshold may be determined according to the predefined or preconfigured rule. Values of M (the quantity of the plurality of FMCWs) and the frequency hopping parameters $\alpha, \beta$ in the first function may be limited by setting the first threshold.

According to the first aspect or the first or second or third possible implementation of the first aspect, in a fourth possible implementation of the method for controlling radar frequency hopping, the plurality of FMCWs constitute one detection subframe, and a plurality of detection subframes constitute one detection frame; and the plurality of detection subframes in the same detection frame use the same first function to determine start frequencies of a plurality of FMCWs included in each of the plurality of detection subframes.

From the foregoing, when the radar is operating, FMCWs of a relatively large quantity need to be continuously transmitted. If start frequencies of all FMCWs transmitted by the radar are determined based on the first function, because of the specific range of the operating bandwidth of the radar and the characteristic of the first function, a difference between start frequencies of adjacent FMCWs becomes smaller, and a frequency hopping effect is not obvious, leading to a reduced anti-interference effect. Based on this, in the present disclosure, a plurality of FMCWs of a specific quantity constitute one detection subframe, a plurality of detection subframes constitute one detection frame, and after the plurality of detection subframes in the same detection frame use the first function to determine start frequencies of a plurality of FMCWs included in the first detection subframe, the radar is controlled to repeatedly and sequentially transmit FMCWs in another detection subframe in the same detection frame based on the determined start frequencies without repeatedly using the first function to determine the start frequencies.

According to the first aspect or the first or second or third possible implementation of the first aspect, in a fifth possible implementation of the method for controlling radar frequency hopping, after the radar detects presence of an interference signal, the radar performs the frequency hopping based on the determined start frequencies.

From the foregoing, in the present disclosure, the radar may transmit the plurality of FMCWs by continuously performing frequency hopping based on the determined start frequencies, or after detecting the presence of the interference signal, may transmit the plurality of FMCWs by continuously performing frequency hopping based on the determined start frequencies, so that operating load is reduced.

According to a second aspect, a radar frequency hopping apparatus is provided, including a processing module configured to determine start frequencies of a plurality of FMCWs based on a first function; and a transmission module configured to sequentially transmit the plurality of FMCWs by performing frequency hopping based on the determined start frequencies.

From the foregoing, in the present disclosure, one first function is designed, and the start frequencies of the plurality of FMCWs are determined based on the first function, to control the radar to sequentially transmit the plurality of FMCWs based on the determined start frequencies when the radar transmits signals through frequency hopping, so that frequency hopping is implemented. It should be noted that, because of a specific range of an operating bandwidth of the radar and a characteristic of the first function, a frequency difference between adjacent FMCWs becomes smaller, and therefore a quantity of the plurality of FMCWs may be usually not excessively large. Therefore, in the present disclosure, frequency hopping can be implemented to reduce a mutual interference probability of the radar. In addition, because the start frequencies of the plurality of FMCWs transmitted by the radar are determined based on the first function, in a speed measurement process, when calculation is performed on phase sequences of echo IF signals in a plurality of continuous periods at a same sampling time point, an existing simple digital signal processing method, for example, FFT, may be used to perform processing and calculation to complete speed measurement of a target object.

According to the second aspect, in a first possible implementation of the radar frequency hopping apparatus, the first function is:

$$b_k = \beta + \frac{\alpha - \beta}{k}, k = 1,2, \ldots M,$$

and M≥2, where $b_k$ is a start frequency of the $k^{th}$ FMCW, k is a sequence number of each FMCW, $\alpha, \beta$ are frequency hopping parameters, and M is a quantity of the plurality of FMCWs.

From the foregoing, the first function is a monotone function that varies with a value of k, and a larger value of k indicates a smaller change rate of the function, to be specific, as sequence numbers of FMCWs become larger, a difference between start frequencies of two adjacent FMCWs becomes smaller. When k=1, $b_1=\alpha$, to be specific, $\alpha$ determines a start frequency of the first function (a start frequency of the first FMCW); and when $$k \to +\infty, b_k = \beta \left(\frac{\alpha - \beta}{+\infty}\right. \text{ is negligible)},$$

to be specific, $\beta$ determines an "end" frequency of the first function. Therefore, the frequency hopping parameters $\alpha, \beta$ are defined based on an operating band of the radar, to determine a start frequency of each FMCW.

According to the second aspect or the first possible implementation of the second aspect, in a second possible implementation of the radar frequency hopping apparatus, the quantity of the plurality of FMCWs is a power of 2.

From the foregoing, because the first function is a monotone function that varies with the value of k, and a larger value of k indicates a smaller change rate of the function, to ensure that frequencies (start frequencies) of the FMCWs can "hop up" as much as possible, the quantity of the plurality of FMCWs cannot be excessively large. In addition, because a minimum calculation unit of a FFT operation is 2, when a time domain length of a waveform is a power of 2, quite effective base 2-FFT may be used to shorten a processing time. Therefore, to facilitate the operation, the quantity of FMCWs may be a power of 2.

According to the first possible implementation of the second aspect, in a third possible implementation of the radar frequency hopping apparatus, a difference between start frequencies of any two adjacent FMCWs is greater than a first threshold, and the first threshold is determined according to a predefined or preconfigured rule.

From the foregoing, the first threshold is intended to ensure that the frequencies (start frequencies) of the FMCWs can "hop up" as much as possible. A value of the first threshold may be determined according to the predefined or preconfigured rule. Values of M (the quantity of the plurality of FMCWs) and the frequency hopping parameters $\alpha, \beta$ in the first function may be limited by setting the first threshold.

According to the second aspect or the first or second or third possible implementation of the second aspect, in a fourth possible implementation of the radar frequency hopping apparatus, the plurality of FMCWs constitute one detection subframe, and a plurality of detection subframes constitute one detection frame; and the plurality of detection subframes in the same detection frame use the same first function to determine start frequencies of a plurality of FMCWs included in each of the plurality of detection subframes.

From the foregoing, when the radar is operating, FMCWs of a relatively large quantity need to be continuously transmitted. If start frequencies of all FMCWs transmitted by the radar are determined based on the first function, because of the specific range of the operating bandwidth of the radar and the characteristic of the first function, a difference between start frequencies of adjacent FMCWs becomes smaller, and a frequency hopping effect is not obvious, leading to a reduced anti-interference effect. Based on this, in the present disclosure, a plurality of FMCWs of a specific quantity constitute one detection subframe, a plurality of detection subframes constitute one detection frame, and after the plurality of detection subframes in the same detection frame use the foregoing first function to determine start frequencies of a plurality of FMCWs included in the first detection subframe, the radar is controlled to repeatedly and sequentially transmit FMCWs in another detection subframe in the same detection frame based on the determined start frequencies without repeatedly using the first function to determine the start frequencies.

According to the second aspect or the first or second or third possible implementation of the second aspect, in a fifth possible implementation of the radar frequency hopping apparatus, the radar frequency hopping apparatus further includes a triggering module, where the triggering module is configured to after presence of an interference signal is detected, trigger the transmission module to perform frequency hopping based on the determined start frequencies.

From the foregoing, in the present disclosure, the radar may transmit the plurality of FMCWs by continuously performing frequency hopping based on the determined start frequencies. Alternatively, a triggering module may be disposed, so that after the presence of the interference signal is detected, the transmission module is triggered to control the radar to transmit the plurality of FMCWs by continuously performing frequency hopping based on the determined start frequencies, so that operating load is reduced.

According to a third aspect, a radar speed measurement method is provided, including controlling, by using the foregoing method for controlling radar frequency hopping, a radar to sequentially transmit a plurality of FMCWs by performing frequency hopping; receiving a signal reflected back by a target; and calculating a relative speed of the target relative to the radar based on the received signal.

From the foregoing, in the present disclosure, frequency hopping is performed based on the foregoing method for controlling radar frequency hopping, and the plurality of FMCWs with determined start frequencies are transmitted to the target; the signal reflected back by the target is received; and a Doppler frequency may be obtained by performing FFT on phase sequences, at a same sampling time point, of received IF signals in a plurality of periods that are obtained after internal frequency mixing and filtering, and the relative speed of the target relative to the radar may be obtained based on the Doppler frequency.

According to the third aspect, in a first possible implementation of the radar speed measurement method, the plurality of FMCWs constitute one detection subframe, and a plurality of detection subframes constitute one detection frame; and the plurality of detection subframes in the same detection frame use a same first function to determine start frequencies of a plurality of FMCWs included in each of the plurality of detection subframes; and the calculating a relative speed of the target relative to the radar includes performing FFT on echo IF signals corresponding to a plurality of FMCWs in at least one detection subframe to obtain a first speed parameter; performing FFT on echo IF signals corresponding to at least one group of a plurality of FMCWs in the detection frame that have a same start frequency to obtain a second speed parameter; and calculating the relative speed of the target based on the first speed parameter and the second speed parameter.

From the foregoing, in a speed measurement process of the radar, the plurality of FMCWs constitute one detection subframe, the plurality of detection subframes constitute one detection frame, and the plurality of detection subframes in the same detection frame use the same first function to determine the start frequencies of the plurality of FMCWs included in each of the plurality of detection subframes. In the speed measurement process, FFT is first performed on phase sequences, at a same sampling time point, of the echo IF signals corresponding to the plurality of transmitted FMCWs in the at least one detection subframe, to obtain the first speed parameter within an operating band range of the detection subframe. A speed measurement range of the first speed parameter is relatively wide. However, because one detection subframe includes a relatively small quantity of FMCWs, in other words, an operating period is relatively short, a resolution of the measured first speed parameter is relatively low. Second, FFT is performed on phase sequences, at a same sampling time point, of the echo intermediate frequency (IF) signals corresponding to the at least one group of the plurality of FMCWs in the detection frame that have the same start frequency, to obtain the second speed parameter within a complete operating period range of the detection frame. Because the group of the plurality of FMCWs that have the same start frequency corresponds to an operating period of one detection frame, a speed measurement resolution of the second speed parameter is relatively high. However, because an interval between selected adjacent FMCWs is relatively large, a speed measurement range of the second speed parameter is relatively narrow. Matching calculation is performed on the first speed parameter and the second speed parameter, so that the relative speed of the target with a wide speed measurement range and a high resolution can be obtained.

According to the first possible implementation of the third aspect, in a second possible implementation of the radar speed measurement method, the calculation includes performing equivalent expansion on a speed measurement range of the second speed parameter, and performing matching calculation on the speed measurement range of the second speed parameter and a speed measurement range of the first speed parameter to obtain the relative speed of the target.

From the foregoing, the first speed parameter has a relatively wide speed measurement range and a relatively low resolution, and the second speed parameter has a relatively narrow speed measurement range and a relatively high resolution. In this case, equivalent expansion calculation is performed on the second speed parameter with the relatively high resolution, so that the speed measurement range of the second speed parameter is the same as the speed measurement range of the first speed parameter. In this case, data with a relatively high resolution in the second speed parameter is matched with data with a relatively low resolution in the first speed parameter, to obtain the relative speed of the target relative to the radar.

According to a fourth aspect, a radar is provided, including the foregoing radar frequency hopping apparatus; a signal receiving module, where the signal receiving module is configured to receive a signal reflected back by a target; and a calculation module configured to calculate a relative speed of the target relative to the radar based on the reflected signal received by the signal receiving module.

From the foregoing, the present disclosure provides a radar based on the foregoing radar frequency hopping apparatus. The radar is configured to sequentially transmit a plurality of FMCWs with determined start frequencies to the target by performing frequency hopping; receive, by using the signal receiving module, the signal reflected back by the target; and perform, by using the calculation module, FFT on phase sequences of received IF signals in a plurality of periods at a same sampling point to obtain a Doppler frequency, and obtain the relative speed of the target relative to the radar based on the Doppler frequency.

According to the fourth aspect, in a first possible implementation of the radar, the plurality of FMCWs constitute one detection subframe, and a plurality of detection subframes constitute one detection frame; and the plurality of detection subframes in the same detection frame use a same first function to determine start frequencies of a plurality of FMCWs included in each of the plurality of detection subframes; and the calculation module includes a first calculation module configured to perform FFT on echo IF signals corresponding to a plurality of FMCWs in at least one detection subframe to obtain a first speed parameter; a second calculation module configured to perform FFT on echo IF signals corresponding to at least one group of a plurality of FMCWs in the detection frame that have a same start frequency to obtain a second speed parameter; and a third calculation module configured to calculate the relative speed of the target relative to the radar based on the first speed parameter and the second speed parameter.

From the foregoing, in a speed measurement process of the radar, the plurality of FMCWs constitute one detection subframe, the plurality of detection subframes constitute one detection frame, and the plurality of detection subframes in the same detection frame use the same first function to determine the start frequencies of the plurality of FMCWs included in each of the plurality of detection subframes. In the speed measurement process, FFT is first performed on phase sequences, at a same sampling time point, of the echo IF signals corresponding to the plurality of transmitted FMCWs in the at least one detection subframe, to obtain the first speed parameter within an operating band range of the detection subframe. A speed measurement range of the first speed parameter is relatively wide. However, because one detection subframe includes a relatively small quantity of FMCWs, in other words, an operating period is relatively short, a resolution of the measured first speed parameter is relatively low. Second, FFT is performed on phase sequences, at a same sampling time point, of the echo IF signals corresponding to the at least one group of the plurality of FMCWs in the detection frame that have the same start frequency, to obtain the second speed parameter within a complete operating period range of the detection frame. Because the group of the plurality of FMCWs that have the same start frequency corresponds to an operating period of one detection frame, a speed measurement resolution of the second speed parameter is relatively high.

However, because an interval between selected adjacent FMCWs is relatively large, a speed measurement range of the second speed parameter is relatively narrow. Matching calculation is performed on the first speed parameter and the second speed parameter, so that the relative speed of the target with a wide speed measurement range and a high resolution can be obtained.

According to the first possible implementation of the fourth aspect, in a second possible implementation of the radar, the third calculation module is configured to perform equivalent expansion on a speed measurement range of the second speed parameter, and perform matching calculation on the speed measurement range of the second speed parameter and a speed measurement range of the first speed parameter to obtain the relative speed of the target relative to the radar.

From the foregoing, the first speed parameter has a relatively wide speed measurement range and a relatively low resolution, and the second speed parameter has a relatively narrow speed measurement range and a relatively high resolution. In this case, equivalent expansion calculation is performed on the second speed parameter with the relatively high resolution, so that the speed measurement range of the second speed parameter is the same as the speed measurement range of the first speed parameter. In this case, data with a relatively high resolution in the second speed parameter is matched with data with a relatively low resolution in the first speed parameter, to obtain the relative speed of the target relative to the radar.

According to a fifth aspect, a chip is provided, including an input interface, an output interface, at least one processor, and at least one memory, where the at least one memory is configured to store code, the at least one processor is configured to execute the code in the memory, and when the code is executed, the chip implements either of the method for controlling radar frequency hopping and the radar speed measurement method.

According to a sixth aspect, a computer-readable storage medium is provided, where program instructions are stored on the computer-readable storage medium, and when the program instructions are executed by a computer, the computer is enabled to perform either of the method for controlling radar frequency hopping and the radar speed measurement method.

According to a seventh aspect, a computer program product is provided, including program instructions, where when the program instructions are executed by a computer, the computer is enabled to perform either of the method for controlling radar frequency hopping and the radar speed measurement method.

According to an eighth aspect, a vehicle is further provided, including the foregoing radar.

BRIEF DESCRIPTION OF DRAWINGS

The characters, features, characteristics, and advantages of the present disclosure will become clearer from the following detailed description with reference to the accompanying drawings.

FIG. 6A is a schematic diagram of an implementation environment involved in radar frequency hopping of according to an embodiment of the present disclosure;

FIG. 6B is a flowchart of a method for controlling radar frequency hopping of according to an embodiment of the present disclosure;

FIG. 6C is a schematic diagram of a frequency hopping pattern of according to an embodiment of the present disclosure;

FIG. 8B is a flowchart of calculation steps in a radar speed measurement method of according to an embodiment of the present disclosure;

FIG. 9A is an architectural diagram of a radar of according to an embodiment of the present disclosure;

DESCRIPTION OF EMBODIMENTS

Figure 1:
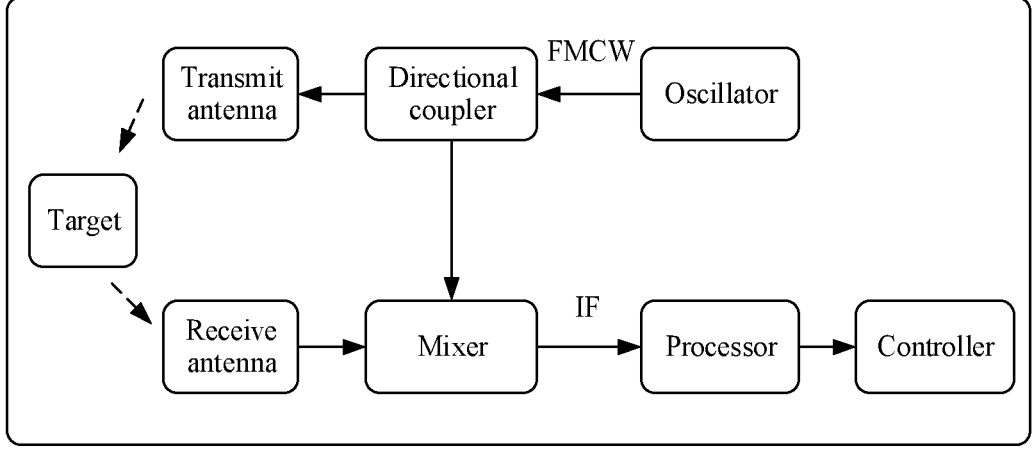
FIG. 1 is an architectural diagram of an existing in-vehicle millimeter wave radar system.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are merely some rather than all of the embodiments of the present disclosure. Generally, components of the embodiments of the present disclosure described and shown in the accompanying drawings herein may be arranged and designed in various configurations. Therefore, the following detailed descriptions of the embodiments of the present disclosure provided in the accompanying drawings are not intended to limit the scope of the claimed application, but merely to represent selected embodiments of the present disclosure. All other embodiments obtained by a person skilled in the art based on the embodiments of the present disclosure without creative efforts shall fall within the protection scope of the present disclosure.

In the following descriptions, "some embodiments" involved describe a subset of all possible embodiments. However, it may be understood that, "some embodiments"

may be same subsets or different subsets of all possible embodiments, and may be combined with each other without conflict.

In the following descriptions, involved terms, such as "first\second\third" or module A, module B, and module C, are merely used to distinguish between similar objects, and do not represent a specific order of objects. It may be understood that, specific orders or priorities may be interchanged if allowed, so that the embodiments of the present disclosure described herein may be implemented in an order other than those shown or described herein.

In the following descriptions, involved reference numerals such as S621 and S622 that indicate steps do not necessarily indicate that the steps are to be performed based on the order, and consecutive steps may be transposed if allowed, or may be performed simultaneously.

Before specific implementations of the present disclosure are further described in detail, technical terms such as radar system, FMCW, and IF involved in the embodiments of the present disclosure, as well as their principles in radar ranging\speed measurement applications are described.

A waveform of a FMCW of a millimeter wave radar is usually a sawtooth wave. The following uses a sawtooth wave as an example to describe in detail a ranging and speed measurement principle of the millimeter wave radar. For ease of analysis, an analytic signal is used for analysis.

Figure 2A:
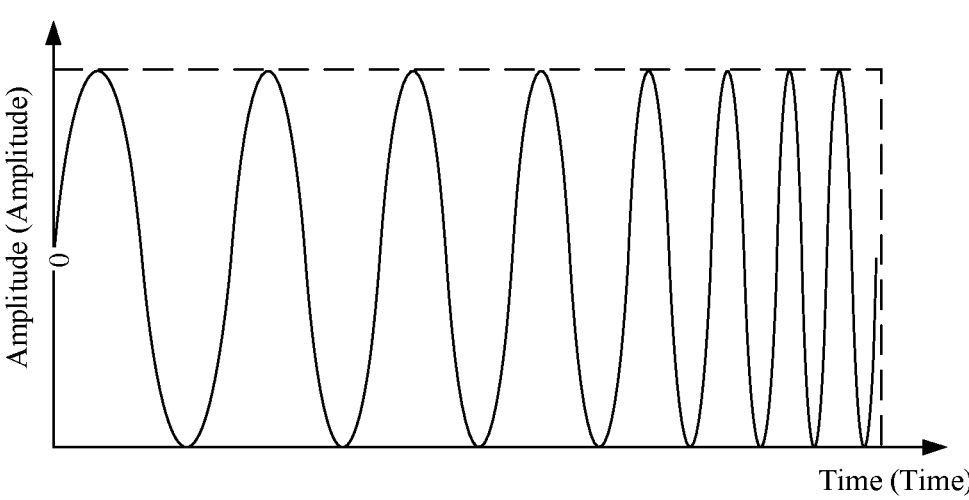
FIG. 2A is a schematic time-amplitude diagram of a single period of a FMCW according to an embodiment of the present disclosure.
Figure 2B:
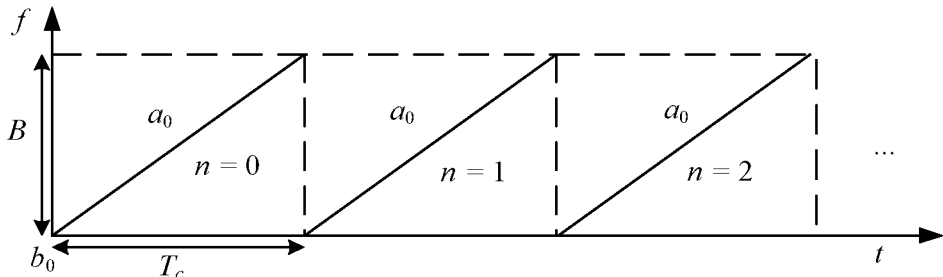
FIG. 2B is a schematic time-frequency diagram of a plurality of periods of a FMCW according to an embodiment of the present disclosure.

As shown in FIG. 2A and FIG. 2B, a FMCW is a signal whose frequency linearly changes with time. It is assumed that a period of the FMCW is $T_c$, a slope of the FMCW is $\alpha_0$, a bandwidth of the FMCW is B, and a start frequency of a baseband signal of the FMCW is $b_0$, an equivalent baseband signal of the FMCW of the $n^{th}$ period output by an oscillator may be represented as:

$$s_{BB,n}^{Tx}(t) = A\exp\left\{j2\pi\left[\frac{a_0}{2}(t-nT_c)^2 + \varphi_0\right]\right\}\exp(j2\pi b_0 t) \quad (1.1)$$

$$nT_c \le t < (n+1)T_c, n = 0,1,2,\ldots,N-1,$$

where

A is a signal amplitude, $\alpha_0$ is a slope of a linear frequency modulated signal sent by a radar, $b_0$, is an intercept (namely, the start frequency of the baseband signal), $\varphi_0$ is an initial phase, and N is a quantity of periods of continuously sending FMCWs. Because a frequency is defined as a change rate of a phase relative to time, a frequency of the baseband signal is:

$$f = \frac{d\left(\frac{a_0}{2}(t-nT_c)^2 + \varphi_0 + b_0 t\right)}{dt} = a_0(t-nT_c) + b_0, \quad (1.2)$$

$$nT_c \le t < (n+1)T_c, n = 0,1,2,\ldots,N-1,$$

where an image of the formula (1.2) is shown in FIG. 2B.

After the foregoing frequency conversion, the equivalent baseband signal of the FMCW of the $n^{th}$ period is transmitted outward by a transmit antenna, and the transmitted signal may be represented as:

$$S_{RF,n}^{Tx}(t) = \quad (1.3)$$

$$s_{BB,n}^{Tx}(t)\exp(j2\pi f_c t) = A\exp\left\{j2\pi\left[\frac{a_0}{2}(t-nT_c)^2 + \varphi_0\right]\right\}\exp[j2\pi(f_c + b_0)t],$$

$$nT_c \le t < (n+1)T_c, n = 0,1,2,\ldots,N-1,$$

where $f_c$ is a carrier frequency. A signal is reflected back after the transmitted signal encounters a target object. A transmitted wave and a reflected wave are the same in shape except for a delay. A received signal of the FMCW of the $n^{th}$ period is represented as:

$$S_{RF,n}^{Rx}(t) = A'\exp\left\{j2\pi\left[\frac{a_0}{2}(t-nT_c-\tau)^2 + \varphi_0\right]\right\}\exp[j2\pi(f_c + b_0)(t-\tau)] \quad (1.4)$$

where $$\tau + nT_c \le t < \tau + (n+1)T_c, n = 0,1,2,\ldots,N-1,$$

A' is a signal amplitude of a signal obtained after a transmit antenna gain, target object reflection, propagation loss, and a receive antenna gain are considered, $\tau$ is a total delay from transmitting a radar signal by a transmitter to reflection of the target object and then to receiving a signal echo by a receiver, and $$\tau = \tau_0 + \frac{2vt}{c}, \quad (1.5)$$

where $\tau_0$ is a radar echo delay caused by a reference distance, v is a radial relative speed of the target object relative to the radar, and c is a speed of light. Considering that the speed v is far less than the speed of light c, for the baseband signal, in subsequent detection, the second term in the foregoing formula has a quite small contribution, and therefore, in the baseband signal, the second term in the formula (1.5) is ignored. However, in the carrier frequency, the second term in the foregoing formula plays a key role in speed detection, and therefore, this term is retained, and the following may be obtained:

$$S_{RF,n}^{Rx}(t) \approx A'\exp\left\{j2\pi\left[\frac{a_0}{2}(t-nT_c-\tau_0)^2 + \varphi_0\right]\right\}\exp[j2\pi(f_c + b_0)(t-\tau)] \quad (1.6)$$

$$\tau + nT_c \le t < \tau + (n+1)T_c, n = 0,1,2,\ldots,N-1$$

A mixer performs frequency mixing on the received signal and the transmitted signal, and a signal obtained after frequency mixing is processed by an IF filter to output an IF signal. The IF signal is represented as:

$$S_{IF,n}^{Rx}(t) = \frac{1}{A}S_{RF,n}^{Tx}(t) \times \left[S_{RF,n}^{Rx}(t)\right]^* \xrightarrow{u=t-nT_c} S_{IF,n}^{Rx}(u) = \quad (1.7)$$

$$A' \times \exp(j\Phi_n) \times \exp\left\{j2\pi\left[\left(a_0\tau_0 + f_d^0\right)u\right]\right\},$$

where, $\tau \le u < T_c$ $$\Phi_n = 2\pi\left[(f_c + b_0)\tau_0 - \frac{a_0}{2}\tau_0^2 + f_d^0 nT_c\right], f_d^0 = (f_c + b_0)\frac{2v}{c},$$

and $$f_d^0$$

is a Doppler frequency formed by the radial relative speed of the target object relative to the radar. The IF signal is sent to a processor for FFT to obtain an IF $f_{IF}$, and $$f_{IF} = a_0 \tau_0 f_d^0 \qquad (1.8)$$

Because $$f_d^0 << a_0 \tau_0, \ f_{IF} \approx a_0 \tau_0$$

Figure 2C:
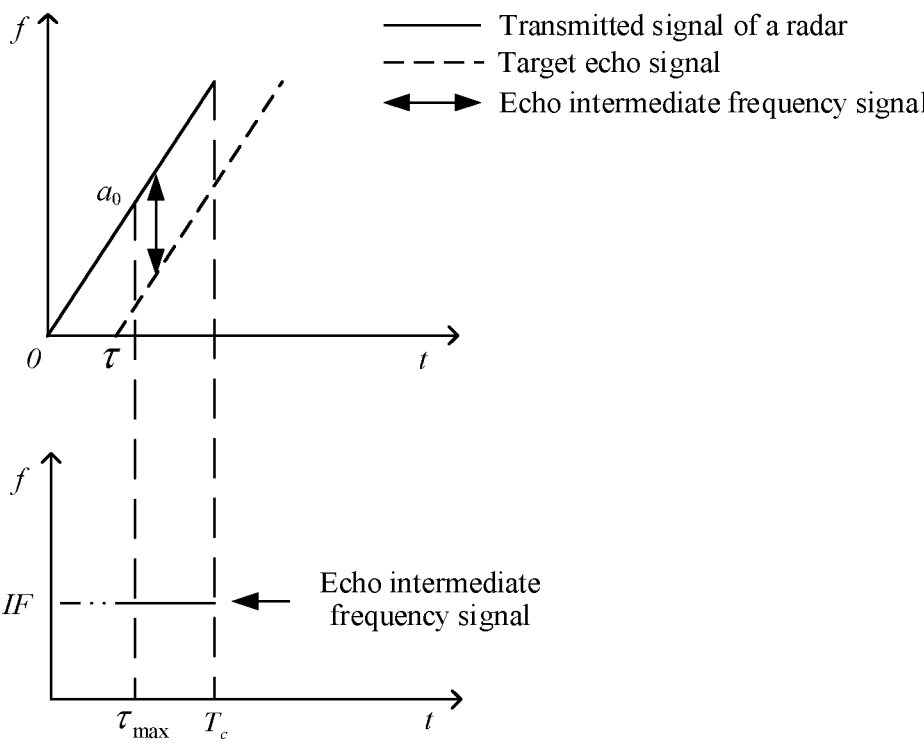
FIG. 2C is a schematic diagram of a relationship between a transmitted signal, a received signal, and an IF signal according to an embodiment of the present disclosure.

In addition, as shown in FIG. 2C, a frequency of the IF signal is a product of a slope of the transmitted wave and the delay $\tau$, that is, $$f_{IF} \approx a_0 \cdot \tau_0 = \frac{B}{T_c} \cdot \frac{2d}{c} = \frac{2d}{c \cdot T_c} B \qquad (1.9)$$

Therefore, a distance d between the radar and the target object is $$d = \frac{c \cdot T_c}{2B} f_{IF} \qquad (1.10)$$

The foregoing derivation is made for one target object, and is also applicable for a case of a plurality of target objects. To be specific, a plurality of IF signals are obtained after receiving and frequency mixing, and the plurality of IF signals are sent to the processor for FFT to obtain intermediate frequencies corresponding to the plurality of target objects.

It can be learned from the foregoing derivation that there is a linear relationship between a frequency difference (the frequency of the IF signal) between the transmitted signal and the received signal and the delay: A larger distance of the target object indicates a later time of receiving a returned wave and a larger difference between the returned wave and an incident wave. A distance to the target object may be determined by determining a frequency level of the IF signal.

For speed detection, it can be learned from the formula (1.7) that a difference between phases of echo IF signals in two adjacent periods at a same sampling time point is a fixed value, that is, $$\Delta\Phi = \Phi_{n+1} - \Phi_n = 2\pi f_d^0 T_c \qquad (1.11)$$

The Doppler frequency $$f_d^0$$

may be obtained by performing FFT on phase sequences of echo IF signals in a plurality of continuous periods at a same sampling time point, and a relationship between the Doppler frequency and the radial relative speed v of the target object may be represented as:

$$f_d^0 = (f_c + b_0)\frac{2v}{c} = \frac{2v}{\lambda}, \qquad (1.12)$$

where
$\lambda$ is a radar signal wavelength.

Therefore, the radial relative speed v between the radar and the target object is:

$$v = \frac{\lambda f_d^0}{2} \qquad (1.13)$$

The foregoing description is a ranging and speed measurement principle of an existing in-vehicle millimeter wave radar system. When there is no interference from another radar, a distance and a relative speed of a target object may be measured quickly and accurately through ranging or speed measurement. However, with an increase of a penetration rate of in-vehicle radars, mutual interference between automotive radars becomes more serious, which reduces a success probability of radar detection or increases a ghost probability of radar detection, leading to non-negligible impact on safe driving.

The following describes in detail a principle of in-vehicle radar mutual interference with reference to FIG. 3 and FIG. 4A to FIG. 4F.

Figure 3:
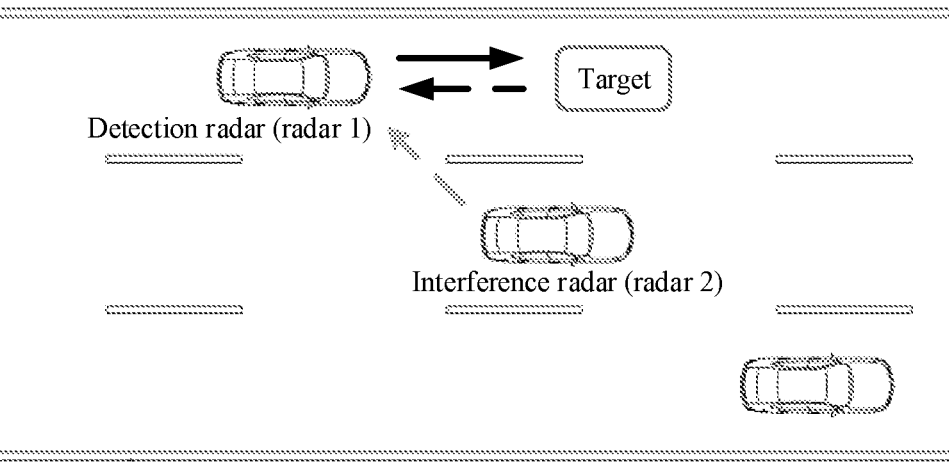
FIG. 3 is a schematic diagram of in-vehicle radar mutual interference according to an embodiment of the present disclosure.

FIG. 3 is a schematic diagram of in-vehicle radar mutual interference. It is assumed that a radar 1 on a first lane is a detection radar, a slope of a FMCW of the detection radar is $\alpha_0$, an intercept of the FMCW of the detection radar is $b_0$, and a period of the FMCW of the detection radar is $T_c$; and a radar 2 on a second lane is an interference radar, a slope of a FMCW of the interference radar is $\alpha_1$, and an intercept of the FMCW of the interference radar is $b_1$. When the radar 1 is operating, the radar 1 transmits a millimeter wave signal a target object directly in front of the radar 1, and receives a millimeter wave signal reflected back by the target object, to perform ranging and speed measurement on the target object in front. In addition, a signal transmitted by the radar 2 (interference radar) on the adjacent second lane is also received by the radar 1.

In this case, it is assumed that $b_1 = b_0$, an echo delay corresponding to a maximum ranging distance of the radar 1 is $\tau_{max}$ (that is, a delay, for example, 1.67 μs, calculated by substituting the maximum ranging distance, for example, 250 m, of the radar 1 into a formula $$\tau = \frac{2d}{c}),$$

and a delay of an interference signal of the radar 2 that arrives at a receive antenna of the radar 1 is $\tau_1$. It is considered that a timing error for a radar transmitting time is $\Delta\tau$ (for example, a transmitting time error 60 ns generated by a GPS timing error). A time range for signal detection of the radar 1 is $\tau_{max}$ to $T_c$.

If a slope of a signal waveform of the radar 1 is the same as a slope of a signal waveform of the radar 2, that is, $\alpha_0 = \alpha_1$, and operating bands of the radar 1 and the radar 2 are the same, a ghost (ghost) occurs. In this case, an IF signal formed at a receiver of the radar 1 is:

$$S_{IF,n}^{Rx,i}(u) = A_i' \times \exp(j\Phi_n^i) \times \exp\{j2\pi[(a_0\tau_i + f_d^i)u]\}, \quad (1.14)$$

$$\Phi_n^i = 2\pi\left(f_c\tau_i - \frac{a_0}{2}\tau_i^2 + b_0\tau_i + \varphi_0 - \varphi_i + f_d^i nT_c\right),$$

$$A_i'$$

is a signal amplitude of a signal of the interference radar (namely, a radar signal transmitted by the radar 2) obtained after a transmit antenna gain, target object reflection, propagation loss, and a receive antenna gain are considered, $\varphi_i$ is an initial phase of the signal of the interference radar, $$f_d^i$$

is a Doppler frequency of the signal of the interference radar that is formed by a radial relative speed of the target object relative to the detection radar, and $\tau_i$ is a delay from transmitting the signal of the interference radar (namely, the radar signal transmitted by the radar 2) from a transmitter of the interference radar to receiving a signal by the receiver of the interfered radar (namely, the receiver of the radar 1).

Figure 4A:
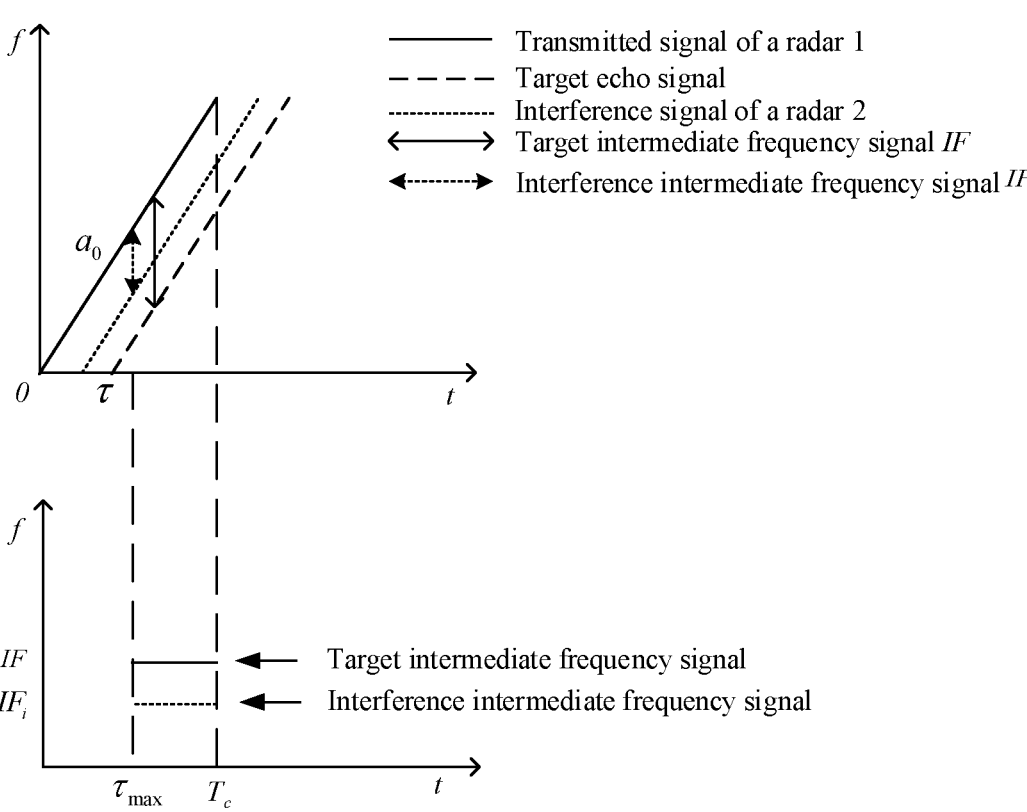
FIG. 4A to FIG. 4F are schematic diagrams of mutual interference cases when a slope of a detection radar and a slope of an interference radar are the same or different according to an embodiment of the present disclosure.
Figure 4B:
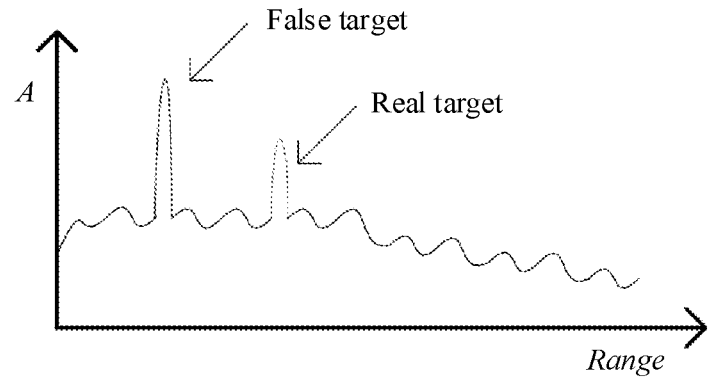

As shown in FIG. 4A, two peak values may be found in a distance response obtained after FFT is performed on the IF signal. As shown in FIG. 4B, each peak value corresponds to one target object. The radar 1 mistakenly considers that there is a target object corresponding to a false target object in front. However, the target object does not exist, in other words, a ghost occurs. After the ghost occurs, an autonomous vehicle slows down or brakes suddenly when there is no object in front, reducing driving comfort.

Figure 4C:
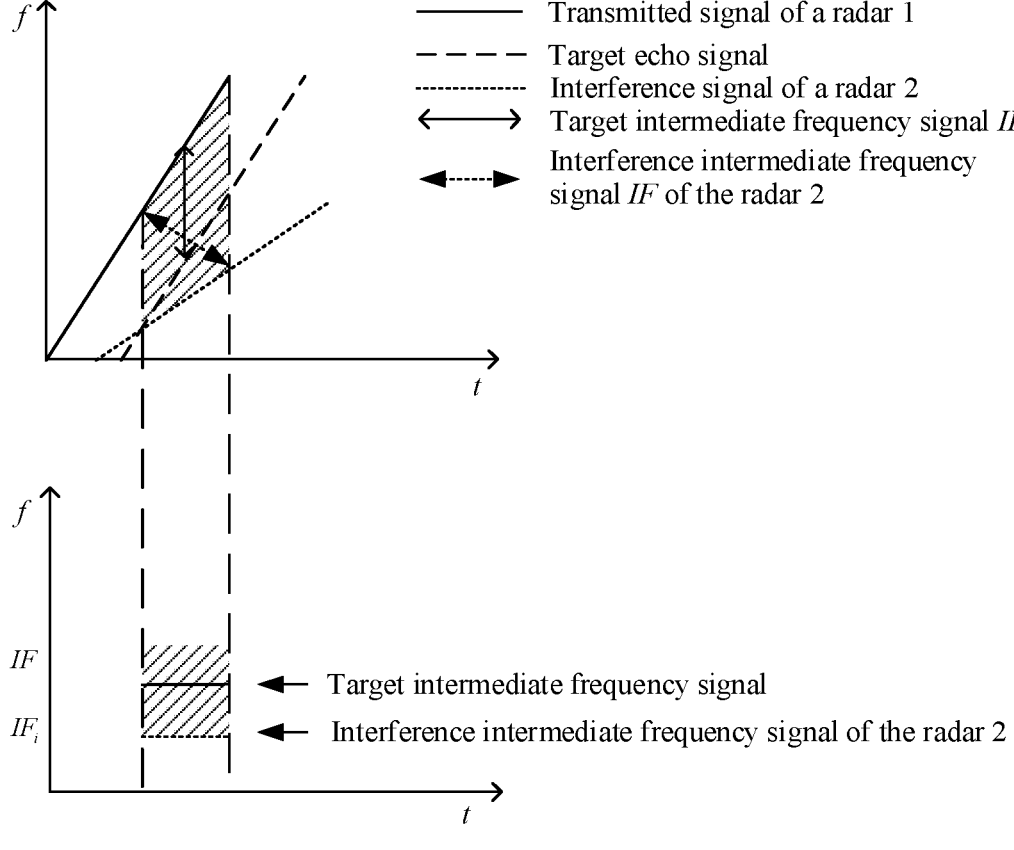

If there is a difference between the slope of the signal waveform of the radar 1 and the slope of the signal waveform of the radar 2, as shown in FIG. 4C, an IF signal including various frequency components is generated after frequency mixing is performed on the interference signal of the radar 2 and a transmitted signal of the radar 1, and $$S_{IF,n}^{Rx,i}(u) = A_i' \times \exp(j\Phi_n^i) \times \exp\left\{j2\pi\left[\left(\frac{a_0 - a_i}{2}\right)u^2 + (a_i\tau_i + f_d^i)u\right]\right\}, \quad (1.15)$$

$$\tau_i \leq u < T_c, n = 0, 1, \ldots, N-1,$$

$$\text{where } \Phi_n^i = 2\pi\left(f_c\tau_i - \frac{a_i}{2}\tau_i^2 + b_0\tau_i + \varphi_0 - \varphi_i + f_d^i nT_c\right).$$

Figure 4D:
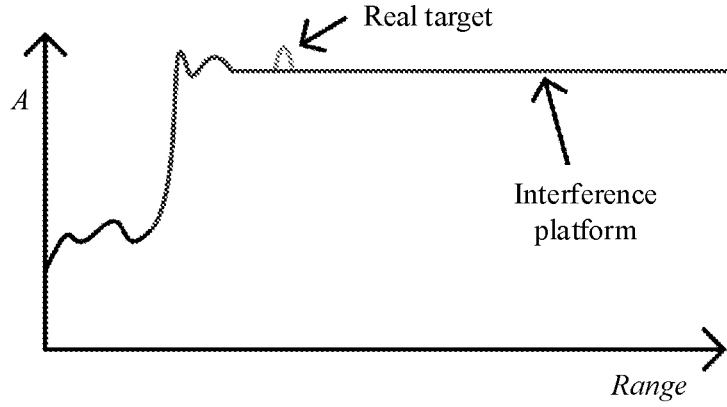

After the FFT, as shown in FIG. 4D, an interference platform occurs, and therefore a real target object is not prominent enough, causing a difficulty to detection and increasing a possibility of missed detection. After missed detection occurs, when there is a target object in front, an autonomous vehicle mistakenly considers that there is no target object and does not slow down or brake, causing a traffic accident and reducing driving safety of the vehicle.

Figure 4E:
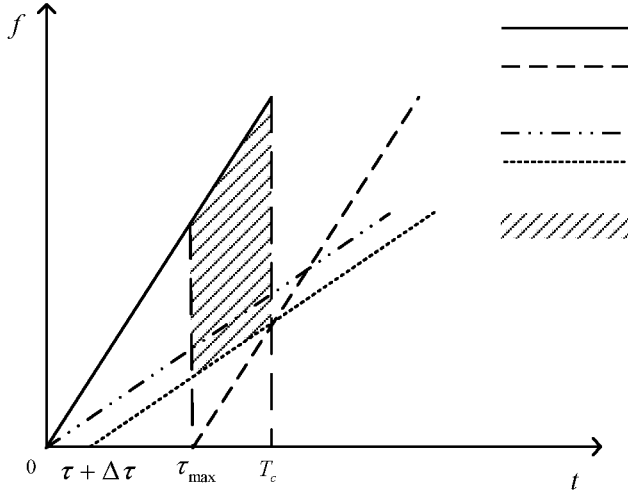
Figures 4F, 5:
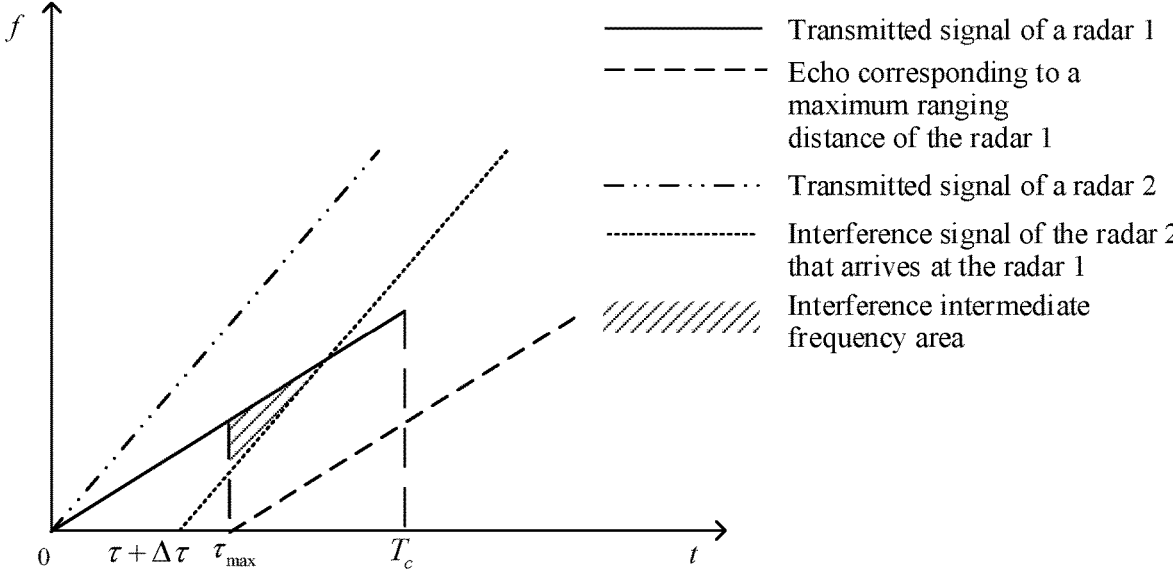
FIG. 5 is a schematic diagram of an existing radar random frequency hopping technology.

There are the following two cases for the difference between the slope of the signal waveform of the radar 1 and the slope of the signal waveform of the radar 2:

When $\alpha_1 > \alpha_0$, as shown in FIG. 4E, because of the presence of an interference IF area, an interference platform problem is generated, and missed detection occurs; and when $\alpha_1 > \alpha_0$, as shown in FIG. 4F, because of the presence of an interference IF area, an interference platform problem is also generated, and missed detection occurs.

Based on the foregoing radar mutual interference problem, in the conventional technology, a radar intra-frame random frequency hopping manner is used to prevent interference between a plurality of radars.

Specifically, FIG. 5 is a schematic diagram of an existing radar random frequency hopping technology. Based on the radar random frequency hopping technology, in an operating process of a radar, the radar transmits FMCWs with different start frequencies by relying on a fully randomized transmitting manner, so that interference is dispersed, thereby preventing interfered continuous operating periods. Based on the intra-frame random frequency hopping technology, when there are a plurality of interference radars, a mutual interference probability can also be reduced.

The conventional technology has the following disadvantages: Although the intra-frame random frequency hopping technology can better reduce a mutual interference probability, because transmitting frequencies in the intra-frame random frequency hopping technology are randomly distributed within a specific bandwidth range without a fixed rule, an existing simple digital signal processing method, for example, FFT, cannot be used to process phase sequences of echo IF signals in a plurality of continuous periods at a same sampling time point to calculate a relative speed of a target object.

Based on the disadvantages in the conventional technology, the embodiments of the present disclosure provide a method for controlling radar frequency hopping. A first function is pre-designed, so that a plurality of FMCWs transmitted by a radar have different start frequencies, thereby greatly reducing cases in which an operating band of the current radar coincides with an operating band of another radar, and reducing a mutual interference probability. It should be noted that "one FMCW" described above and below is actually a FMCW of a pulse repetition period. For ease of description, the form of "one FMCW" is directly used. In addition, it can be learned from the following specific embodiment that, in the present disclosure, the start frequencies of the plurality of FMCWs are arranged based on the first function, that is, a plurality of corresponding IF signals received by the radar are also arranged based on the first function. Therefore, in a speed measurement process, when phase sequences of echo IF signals in a plurality of continuous periods at a same sampling time point are calculated, an existing simple digital signal processing method, for example, FFT, may be used to perform processing and calculation to complete speed measurement of a target object. The following describes in detail the present disclosure.

FIG. 6A is a schematic diagram of an implementation environment involved in radar frequency hopping according to an embodiment of the present disclosure. The implementation environment includes a radar 611 and a control device 612, where the radar 611 may have a structure shown in FIG. 1, including apparatuses such as an oscillator, a transmit antenna, a receive antenna, a mixer, a processor, and a controller, and performing functions corresponding to the apparatuses; and the control device 612 is configured to control the radar 611 to perform frequency hopping, and in some embodiments, may perform the following method for controlling radar frequency hopping.

With reference to a flowchart shown in FIG. 6B, the following describes some embodiments of the method for controlling radar frequency hopping in the present disclosure. The method includes the following steps:

S621: Determine start frequencies of a plurality of FMCWs based on a first function.

S622: Control a radar to sequentially transmit the plurality of FMCWs by performing frequency hopping based on the determined start frequencies.

The first function may be:

$$b_k = \beta + \frac{\alpha - \beta}{k}, k = 1, 2, \ldots M,$$

and M≥2, where $b_k$ is a start frequency of the $k^{th}$ FMCW, k is a sequence number of each FMCW, $\alpha, \beta$ are frequency hopping parameters, and M is a quantity of the plurality of FMCWs.

The first function may be alternatively a variant, for example, a variant in which a coefficient is further set for a denominator, but a similar inversely proportional function can be obtained through a mathematical transform. Therefore, regardless of how the form changes, a function can be used provided that the function can be transformed into the foregoing function or a similar function form.

In addition, the quantity of the plurality of FMCWs may be a power of 2. Because a minimum calculation unit of a FFT operation is 2, when a time domain length of a waveform is a power of 2, quite effective base 2-fast Fourier transform may be used to shorten a processing time, to facilitate the operation. Therefore, when the quantity of the plurality of FMCWs is a power of 2, it is convenient to perform subsequent FFT on an echo IF signal.

In addition, a difference between start frequencies of any two adjacent FMCWs is greater than a first threshold. The first threshold is determined according to a predefined or preconfigured rule. The first threshold is intended to enable frequencies (start frequencies) of the FMCWs to "hop up" as much as possible, in other words, to make a difference between the frequencies (start frequencies) of the FMCWs relatively large, so that the frequency hopping is more obvious.

The plurality of FMCWs constitute one detection subframe, and a plurality of detection subframes constitute one detection frame; and the plurality of detection subframes in the same detection frame use the same first function to determine start frequencies of a plurality of FMCWs included in each of the plurality of detection subframes.

Specifically, when the radar is operating, FMCWs of a relatively large quantity need to be continuously transmitted. If start frequencies of all FMCWs transmitted by the radar are determined based on the first function, because of a specific range of an operating bandwidth of the radar and a characteristic of the first function, a difference between start frequencies of adjacent FMCWs becomes smaller, and a frequency hopping effect is not obvious, leading to a reduced anti-interference effect. Based on this, in the present disclosure, a plurality of FMCWs of a specific quantity constitute one detection subframe, a plurality of detection subframes constitute one detection frame, and after the plurality of detection subframes in the same detection frame use the first function to determine start frequencies of a plurality of FMCWs included in the first detection subframe, the radar is controlled to repeatedly and sequentially transmit FMCWs in another detection subframe in the same detection frame based on the determined start frequencies without repeatedly using the first function to determine the start frequencies.

The radar is a millimeter wave radar, for example, an in-vehicle millimeter wave radar, a millimeter wave radar used on a road side, or even a millimeter wave radar installed on an unmanned aerial vehicle.

After the radar detects presence of an interference signal, the radar performs frequency hopping based on the determined start frequencies. For example, the interference signal is interference information from a radar of another vehicle, such as an interference signal from a corresponding roadside radar in vehicle-to-infrastructure communication, such as a speed measurement radar or a traffic measurement radar, or an interference signal from an unmanned aerial vehicle with a millimeter wave radar.

Still with reference to the flowchart of the method for controlling radar frequency hopping according to the embodiments of the present disclosure that is shown in FIG. 6B, a specific implementation of the method for controlling radar frequency hopping in the present disclosure is described.

Before the description, a relationship between a detection frame, a detection subframe, and a FMCW is explained. Each detection frame includes K FMCWs, each detection frame is equally divided into N detection subframes, and each detection subframe includes M=K/N FMCWs, where K>1 and N>1.

When the radar is operating, FMCWs of a relatively large quantity need to be continuously transmitted. If start frequencies of all FMCWs transmitted by the radar are determined based on the first function, because of a specific range of an operating bandwidth of the radar and a characteristic of the first function, a difference between start frequencies of adjacent FMCWs becomes smaller, and a frequency hopping effect is not obvious, leading to a reduced anti-interference effect. M FMCWs transmitted by the radar constitute one detection subframe, N detection subframes constitute one detection frame, each detection frame includes K FMCWs (M=K/N), and a plurality of detection subframes in the same detection frame use the same first function to determine start frequencies of M (M=K/N) FMCWs included in each of the plurality of detection subframes.

In this embodiment, the method for controlling radar frequency hopping includes the following steps:

S621: Determine start frequencies of a plurality of FMCWs based on a first function.

S622: Control a radar to sequentially transmit the plurality of FMCWs by performing frequency hopping based on the determined start frequencies.

FIG. 6C is a schematic diagram of a frequency hopping pattern. It should be noted herein that the frequency hopping pattern in this embodiment refers to a distribution rule of start frequencies of a plurality of FMCWs, and is not a real pattern or image. Dot distribution in the frequency hopping pattern reflects a start frequency distribution sequence of M(M=K/N) FMCWs in a detection subframe, and a start frequency distribution sequence of M (M=K/N) FMCWs is the same in each of N detection subframes in a same detection frame, in other words, start frequencies of FMCWs with a same sequence number are the same in the N detection subframes.

Specifically, the first function is:

$$b_k = \frac{(k-1)\beta + \alpha}{k} = \beta + \frac{\alpha - \beta}{k}, k = 1, 2. \ldots, K/N,$$

where $b_k$ is a start frequency of the $k^{th}$ FMCW in each detection subframe, k is a sequence number of each FMCW included in a detection subframe, $\alpha, \beta$ are frequency hopping parameters, and K/N=M is a quantity of FMCWs included in each detection subframe.

It can be learned from the foregoing formula that the first function is a function that varies with a value of k. When k=1, $b_1 = \alpha$, to be specific, $\alpha$ determines a start frequency of the first function (a start frequency of the first FMCW in the detection subframe); and when $$k \to +\infty, b_k = \beta \left( \frac{\alpha - \beta}{+\infty} \text{ is negligible} \right),$$

to be specific, $\beta$ determines an "end" frequency of the first function. In actual application, a quantity of FMCWs in a detection subframe is not infinite. Therefore, an actual end frequency of the first function is not equal to but a value relatively close to $\beta$.

Because the frequency hopping is initially intended to combat interference (achieve a relatively small interference probability), it is expected that the frequencies (start frequencies) of the FMCWs can "hop up" as much as possible. However, it can be learned from the first function that the first function is a monotone function that varies with the value of k, and a larger value of k indicates a smaller change rate of the function, to be specific, as sequence numbers of FMCWs become larger, a difference between start frequencies of two adjacent FMCWs becomes smaller. Therefore, the value of k cannot be excessively large, in other words, a quantity K/N of FMCWs included in each detection subframe cannot be excessively large. In addition, because a minimum calculation unit of a FFT operation is 2, when a time domain length of a waveform is a power of 2, quite effective base 2-fast Fourier transform may be used to shorten a processing time. Therefore, to facilitate the operation, a power of 2 (for example, 8) is selected as a maximum value $k_{max} = K/N$ of k with the greatest effort. In addition, it further needs to be ensured that a difference between start frequencies of the last two FMCWs in a detection subframe needs to be greater than the first threshold $\Delta f$, to implement the purpose of "hopping up". For ease of description, the start frequencies of the last two FMCWs in the detection subframe are defined as $b_{b_{max}}$ and $b_{k_{max}}^{-1}$, a FMCW sequence number corresponding to $k_{max}$−1 is K/N−1, and a FMCW sequence number corresponding to $k_{max}$−1 is K/N−1. In this case, $$\left| b_{k_{max}} - b_{k_{max}-1} \right| = \left| (\alpha - \beta) \left( \frac{1}{k_{max}} - \frac{1}{k_{max} - 1} \right) \right| \geq \Delta f;$$

and therefore, an inequality is obtained:

$$|\alpha - \beta| \geq k_{max}(k_{max}-1)\Delta f \qquad \text{Formula (2)}$$

A value of the minimum frequency hopping threshold $\Delta f$ is not fixed, and may be selected based on an operating band of the radar and the quantity of FMCWs included in each detection subframe. This embodiment does not limit a specific value of the minimum frequency hopping threshold, provided that the foregoing purpose of "hopping up" is met.

In addition, in consideration of a limitation of the operating band of the radar, when the radar performs frequency hopping, a total operating bandwidth of the radar cannot be exceeded. In addition, an operating bandwidth of a FMCW further needs to be considered. In this case, $$|b_1 - b_{k_{max}}| \leq B - B_w, \text{ where}$$

$\beta$ is the total operating bandwidth of the radar, $B_w$ is an operating bandwidth of one FMCW, and $\beta \geq B_w$. $b_1 = \alpha$ and $$b_{k_{max}} = \beta + \frac{\alpha - \beta}{k_{max}}$$

are substituted to obtain $$\left| (\alpha - \beta) \frac{k_{max} - 1}{k_{max}} \right| \leq B - B_w.$$

That is, an inequality is obtained:

$$|(\alpha - \beta)| \leq (B - B_w) \frac{k_{max} - 1}{k_{max}} \qquad \text{Formula (3)}$$

In actual application, when the frequency hopping parameters $\alpha, \beta$ used to determine the start frequency and the "end" frequency of the first function are selected, the frequency hopping parameters need to be predefined or randomly generated with reference to parameters such as the operating band of the radar, the operating bandwidth $B_w$ of the FMCW, and a slope of a FMCWFMCW transmitted by the radar. For ease of the following description, it is assumed that the operating band of the radar is 0 to $\beta$ the total operating bandwidth of the radar is and the slope of the FMCW transmitted by the radar is represented by a letter a.

The following analyzes in detail selection of $\alpha, \beta$ with reference to the foregoing two inequalities (the formula (2) and the formula (3)). Details are as follows:

Assuming that $\alpha > \beta$ in other words, the start frequency of the first function is greater than the "end" frequency of the first function, the radar performs frequency hopping through hopping from a high frequency to a low frequency, and the following may be obtained from the foregoing two inequalities (the formula (2) and the formula (3)):

$$\begin{cases} \alpha \geq k_{max}(k_{max} - 1)\Delta f + \beta \\ \alpha \leq (B - B_w)\frac{k_{max}}{k_{max} - 1} + \beta \end{cases} \qquad \text{Formula (4)}$$

When a>0, in other words, when a radar waveform is a rising-ramp sawtooth wave, the start frequency $b_1$ (namely, a start frequency for the frequency hopping) that is of the first FMCW of the detection subframe and that is determined by the radar based on the foregoing similar inversely proportional function plus the operating bandwidth $B_w$ of the FMCW cannot exceed the highest frequency value of the operating band of the radar, and a start frequency $b_{k_{max}}$ (namely, an end frequency for the frequency hopping) of the last FMCW of the detection subframe cannot be lower than the lowest frequency value 0 of the operating band of the radar. In this case, $$\begin{cases} \alpha \le B - B_w \\ \alpha \ge (1 - k_{max})\beta \end{cases} \qquad \text{Formula (5)}$$

When a<0, in other words, when a radar waveform is a falling-ramp sawtooth wave, the start frequency $b_1$ (namely, the start frequency for the frequency hopping) that is of the first FMCW of the detection subframe and that is determined by the radar based on the foregoing similar inversely proportional function cannot exceed the highest frequency value $\beta$ of the operating band of the radar, and a start frequency $b_{k_{max}}$ (namely, an end frequency for the frequency hopping) of the last FMCW of the detection subframe minus the operating bandwidth $B_w$ of the FMCW cannot be lower than the lowest frequency value 0 of the operating band of the radar. In this case, $$\begin{cases} \alpha \le B \\ \alpha \ge (1 - k_{max})\beta + k_{max}B_w \end{cases} \qquad \text{Formula (6)}$$

Similarly, assuming that $\alpha<\beta$ in other words, the start frequency of the first function is less than the "end" frequency of the first function, the radar performs frequency hopping through hopping from a low frequency to a high frequency, and the following may be obtained from the foregoing two inequalities (the formula (2) and the formula (3)):

$$\begin{cases} \alpha \le \beta - k_{max}(k_{max} - 1)\Delta f \\ \alpha \ge \beta - (B - B_w)\dfrac{k_{max}}{k_{max} - 1} \end{cases} \qquad \text{Formula (7)}$$

When a>0, in other words, when a radar waveform is a rising-ramp sawtooth wave, the start frequency $b_1$ (namely, a start frequency for the frequency hopping) that is of the first FMCW of the detection subframe and that is determined by the radar based on the first function cannot be lower than the lowest frequency value 0 of the operating band of the radar, and a start frequency $b_{k_{max}}$ (namely, an end frequency for the frequency hopping) of the last FMCW of the detection subframe plus the operating bandwidth $B_w$ of the FMCW cannot be higher than the highest frequency value of the operating band of the radar. In this case, $$\begin{cases} \alpha \ge 0 \\ \alpha \le (1 - k_{max})\beta + k_{max}(B - B_w) \end{cases} \qquad \text{Formula (8)}$$

When a<0, in other words, when a radar waveform is a falling-ramp sawtooth wave, the start frequency $b_1$ (namely, a start frequency for the frequency hopping) that is of the first FMCW of the detection subframe and that is determined by the radar based on the similar inversely proportional function minus the operating bandwidth $B_w$ of the FMCW cannot be lower than the lowest frequency value 0 of the operating band of the radar, and a start frequency $b_{k_{max}}$ (namely, an end frequency for the frequency hopping) of the last FMCW of the detection subframe cannot be higher than the highest frequency value $\beta$ of the operating band of the radar. In this case,

22

$$\begin{cases} \alpha \ge B_w \\ \alpha \le (1 - k_{max})\beta + k_{max}B \end{cases} \qquad \text{Formula (9)}$$

In conclusion, the following may be obtained:

When $\alpha>\beta$ and a>0, the following may be obtained from the formula (4) and the formula (5):

$$\begin{cases} \alpha \ge k_{max}(k_{max} - 1)\Delta f + \beta \\ \alpha \le (B - B_w)\dfrac{k_{max}}{k_{max} - 1} + \beta \\ \alpha \le B - B_w \\ \alpha \ge (1 - k_{max})\beta \end{cases} \qquad \text{Formula (10)}$$

When $\alpha>\beta$ and a<0, the following may be obtained from the formula (4) and the formula (6):

$$\begin{cases} \alpha \ge k_{max}(k_{max} - 1)\Delta f + \beta \\ \alpha \le (B - B_w)\dfrac{k_{max}}{k_{max} - 1} + \beta \\ \alpha \le B \\ \alpha \ge (1 - k_{max})\beta + k_{max}B_w \end{cases} \qquad \text{Formula (11)}$$

When $\alpha<\beta$ and a>0, the following may be obtained from the formula (7) and the formula (8):

$$\begin{cases} \alpha \le \beta - k_{max}(k_{max} - 1)\Delta f \\ \alpha \ge \beta - (B - B_w)\dfrac{k_{max}}{k_{max} - 1} \\ \alpha \ge 0 \\ \alpha \le (1 - k_{max})\beta + k_{max}(B - B_w) \end{cases} \qquad \text{Formula (12)}$$

When $\alpha<\beta$ and a<0, the following may be obtained from the formula (7) and the formula (9):

$$\begin{cases} \alpha \le \beta - k_{max}(k_{max} - 1)\Delta f \\ \alpha \ge \beta - (B - B_w)\dfrac{k_{max}}{k_{max} - 1} \\ \alpha \ge B_w \\ \alpha \le (1 - k_{max})\beta + k_{max}B \end{cases} \qquad \text{Formula (13)}$$

Based on the formula (10), the formula (11), the formula (12), and the formula (13), when the frequency hopping parameters $\alpha,\beta$ of the first function are predefined or selected, based on a frequency hopping manner (from a high frequency to a low frequency or from a low frequency to a high frequency), the corresponding operating band of the radar, the operating bandwidth of the FMCW, and the like, the defined or selected frequency hopping parameters $\alpha,\beta$ need to satisfy at least one of the formula (10), the formula (11), the formula (12), and the formula (13).

It is assumed that $k_{max}=8$, that is, each detection subframe includes a maximum of eight FMCWs, the first threshold $\Delta f$ is 20 megahertz (MHz), the total operating bandwidth B of the radar is 20 GHz, the operating bandwidth $\beta_w$ of the FMCW is 200 MHz, and a unit of $\alpha,\beta$ is MHz. The parameters are substituted into the formula (10), the formula (11), the formula (12), and the formula (13) to obtain the following.

When $\alpha>\beta$ and $a>0$, $$\begin{cases} \alpha \geq 1120 + \beta \\ \alpha \leq 2057 + \beta \\ \alpha \leq 1800 \\ \alpha \geq -7\beta \end{cases} \qquad \text{Formula (14)}$$

When $\alpha>\beta$ and $a<0$, $$\begin{cases} \alpha \geq 1120 + \beta \\ \alpha \leq 2057 + \beta \\ \alpha \leq 2000 \\ \alpha \geq -7\beta + 1600 \end{cases} \qquad \text{Formula (15)}$$

When $\alpha<\beta$ and $a>0$, $$\begin{cases} \alpha \leq \beta - 1120 \\ \alpha \geq \beta - 2057 \\ \alpha \geq 0 \\ \alpha \leq -7\beta + 14400 \end{cases} \qquad \text{Formula (16)}$$

When $\alpha<\beta$ and $a<0$, $$\begin{cases} \alpha \leq \beta - 1120 \\ \alpha \geq \beta - 2057 \\ \alpha \geq 200 \\ \alpha \leq -7\beta + 16000 \end{cases} \qquad \text{Formula (17)}$$

Therefore, based on the formula (14), the formula (15), the formula (16), and the formula (17), in actual application, the radar enables the frequency hopping parameters $\alpha,\beta$ to satisfy at least one of the formula (14), the formula (15), the formula (16), and the formula (17) based on a design requirement. For example, when $\alpha=1200$ and $\beta=0$, the formula (14) is satisfied. In other words, the formula (14) can be satisfied.

Figure 7:
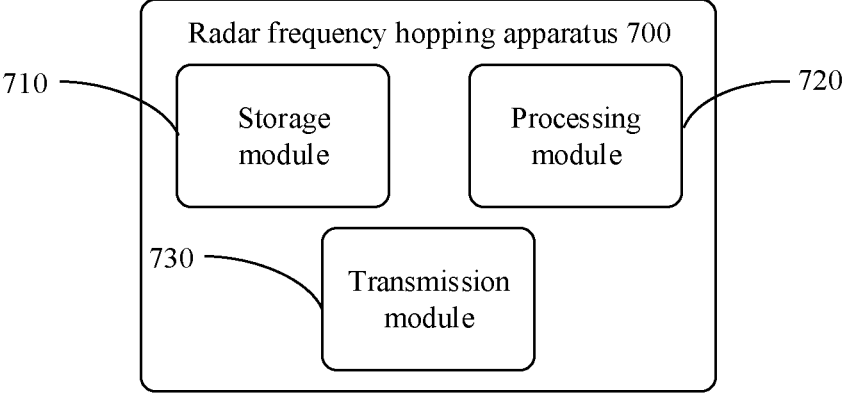
FIG. 7 is an architectural diagram of a radar frequency hopping apparatus of according to an embodiment of the present disclosure.

FIG. 7 is a schematic diagram of a radar frequency hopping apparatus according to an embodiment of the present disclosure. The radar frequency hopping apparatus 700 includes a storage module 710, a processing module 720, and a transmission module 730.

The storage module 710 is configured to store frequency hopping parameters of a radar, and the frequency hopping parameters include a first function.

The processing module 720 is configured to determine start frequencies of M (K/N=M) FMCWs based on the first function.

The transmission module 730 is configured to sequentially transmit the M FMCWs by performing frequency hopping based on the determined start frequencies.

In some embodiments, the storage module 710 may be a memory in a radar system, or may be an external storage device, and communicates with the processing module 720 wirelessly or using a wired connection to provide the frequency hopping parameters stored in the storage module 710. The processing module 720 is also not limited to a separate processing module or processing chip. On the premise that the function of determining the start frequencies of the M FMCWs based on the first function is implemented, the processing module 720 may be a processor, a microcontroller unit (Microcontroller Unit, MCU), or the like in the radar system.

In some embodiments, the M FMCWs constitute one detection subframe, N detection subframes constitute one detection frame, and the N detection subframes in the same detection frame use the same first function to determine start frequencies of M FMCWs included in each of the N detection subframes.

In some embodiments, the first function used in the present disclosure may be the first function in the foregoing method for controlling radar frequency hopping, that is, $$b_k = \frac{(k-1)\beta + \alpha}{k} = \beta + \frac{\alpha - \beta}{k}, k = 1, 2, \ldots, K/N,$$

where $b_k$ is a start frequency of the $k^{th}$ FMCW in each detection subframe, k is a sequence number of each FMCW included in a detection subframe, $\alpha,\beta$ are frequency hopping parameters, K is a quantity of FMCWs included in each detection frame, and K/N=M is a quantity of FMCWs included in each detection subframe.

The first function is a monotone function that varies with a value of k, and a larger value of k indicates a smaller change rate of the function, to be specific, as sequence numbers of FMCWs become larger, a difference between start frequencies of two adjacent FMCWs becomes smaller. When k=1, $b_1=\alpha,\beta$ to be specific, a determines a start frequency of the first function (a start frequency of the first FMCW of the detection subframe); and when $$k \to +\infty, b_k = \beta\left(\frac{\alpha - \beta}{+\infty} \text{ is negligible}\right),$$

to be specific, $\beta$ determines an "end" frequency of the first function. Therefore, the frequency hopping parameters $\alpha,\beta$ are defined based on an operating band of the radar, to determine a start frequency of each FMCW in the detection subframe.

In some embodiments, because a minimum calculation unit of a FFT operation is 2, when a time domain length of a waveform is a power of 2, quite effective base 2-fast Fourier transform may be used to shorten a processing time. Therefore, to facilitate subsequent FFT on an echo IF signal, the quantity of FMCWs included in each detection subframe, that is, K/N, may be a power of 2.

Figure 8A:
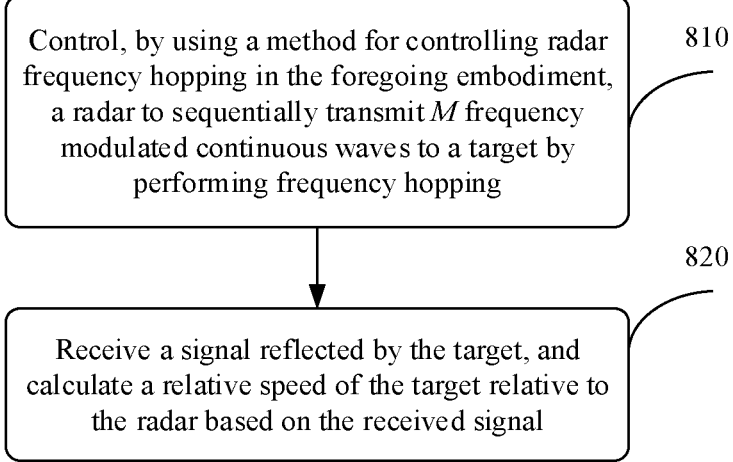
FIG. 8A is a flowchart of a radar speed measurement method of according to an embodiment of the present disclosure.

FIG. 8A is a flowchart of a radar speed measurement method according to an embodiment of the present disclosure. The method includes the following steps:

S810: Control, by using the method for controlling radar frequency hopping in the foregoing embodiment, a radar to sequentially transmit M (K/N=M) FMCWs to a target by performing frequency hopping.

S820: Receive a signal reflected back by the target, and calculate a relative speed of the target relative to the radar based on the received signal.

In some embodiments, the M FMCWs constitute one detection subframe, N detection subframes constitute one detection frame, and the N detection subframes in the same detection frame use a same first function to determine start frequencies of M FMCWs included in each of the N detection subframes.

In some embodiments, as shown in FIG. 8B, step S820 further includes:

S8201: Perform FFT on echo IF signals corresponding to M FMCWs in at least one detection subframe to obtain a first speed parameter.

In this step, FFT is performed on phase sequences, at a same sampling time point, of the echo IF signals corresponding to the M FMCWs included in the at least one detection subframe, to obtain the first speed parameter within an operating band range of the detection subframe. A speed measurement range of the first speed parameter is relatively wide. However, because one detection subframe includes a relatively small quantity of FMCWs, in other words, an operating period is relatively short, a resolution of the measured first speed parameter is relatively low, to be specific, two adjacent measured speed values whose resolutions are less than the resolution cannot be accurately distinguished, and fuzzy output is performed. Therefore, values obtained in the first speed parameter are actually a group of relatively fuzzy values.

S8202: Perform FFT on echo IF signals corresponding to at least one group of N FMCWs in the detection frame that have a same start frequency to obtain a second speed parameter.

In this step, FFT is performed on phase sequences, at a same sampling time point, of the echo IF signals corresponding to the at least one group of the N FMCWs in the detection frame that have the same start frequency, to obtain the second speed parameter within a complete operating period range of the detection frame. Because the group of the plurality of FMCWs that have the same start frequency corresponds to an operating period of one detection frame, a speed measurement resolution of the second speed parameter is relatively high. However, because an interval between selected adjacent FMCWs is relatively large, a speed measurement range of the second speed parameter is relatively narrow, to be specific, a range of values obtained in the second speed parameter is relatively narrow, but the values are more accurate.

S8203: Calculate the relative speed of the target based on the first speed parameter and the second speed parameter.

In this step, the first speed parameter has a relatively wide speed measurement range and a relatively low resolution, and the second speed parameter has a relatively narrow speed measurement range and a relatively high resolution. In this case, equivalent expansion calculation is performed on the second speed parameter with the relatively high resolution, so that the speed measurement range of the second speed parameter is the same as the speed measurement range of the first speed parameter. In this case, data with a relatively high resolution that is obtained after the equivalent expansion (namely, a more accurate value after the equivalent expansion) in the second speed parameter is matched with data with a relatively low resolution (namely, a relatively fuzzy value) in the first speed parameter, so that the relative speed of the target relative to the radar can be obtained.

FIG. 9A is a schematic diagram of a radar according to an embodiment of the present disclosure. The radar 900 includes a radar frequency hopping apparatus 910, a signal receiving module 920, and a calculation module 930.

In this embodiment, the radar frequency hopping apparatus 910 may be the radar frequency hopping apparatus 700 in FIG. 7. The radar frequency hopping apparatus 910 sequentially transmits M (K/N=M) FMCWs to a target by performing frequency hopping by using the method for controlling radar frequency hopping in the foregoing embodiment.

The signal receiving module 920 is configured to receive a signal reflected back by the target.

The calculation module 930 is configured to calculate a relative speed of the target relative to the radar based on the reflected signal received by the signal receiving module 920.

In some embodiments, the calculation module 930 is not limited to a separate calculation module or chip. On the premise that the function of calculating the relative speed of the target relative to the radar is implemented, the calculation module 930 may be the processing module 720 in FIG. 7, or may be a processor, a CPU, or the like in a radar system.

In some embodiments, the M FMCWs constitute one detection subframe, N detection subframes constitute one detection frame, and the N detection subframes in the same detection frame use a same first function to determine start frequencies of M FMCWs included in each of the N detection subframes.

Figure 9B:
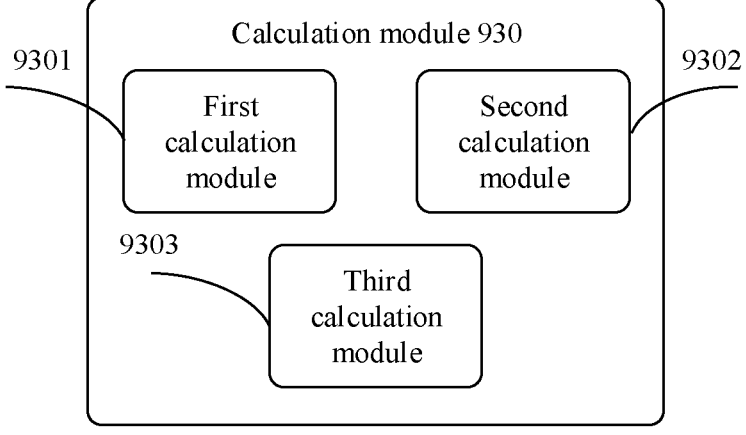
FIG. 9B is an architectural diagram of a calculation module in a radar of according to an embodiment of the present disclosure.

In some embodiments, as shown in FIG. 9B, the calculation module 930 includes a first calculation module 9301, a second calculation module 9302, and a third calculation module 9303.

The first calculation module 9301 is configured to perform FFT on echo IF signals corresponding to M FMCWs in at least one detection subframe to obtain a first speed parameter.

The second calculation module 9302 is configured to perform FFT on echo IF signals corresponding to at least one group of N FMCWs in the detection frame that have a same start frequency to obtain a second speed parameter.

The third calculation module 9303 is configured to calculate the relative speed of the target through matching based on the first speed parameter and the second speed parameter.

Figure 10:
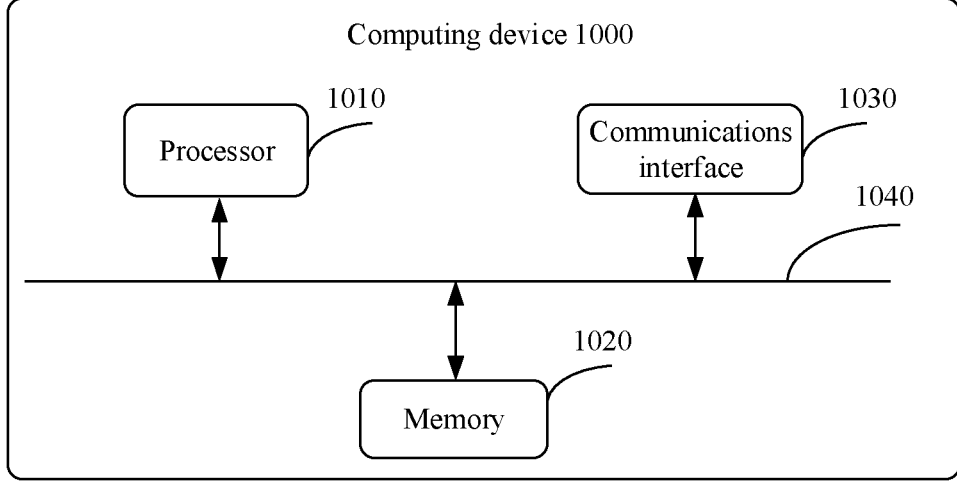
FIG. 10 is an architectural diagram of a computing device of according to an embodiment of the present disclosure.

FIG. 10 is a structural diagram of a computing device according to an embodiment of the present disclosure. The computing device 1000 includes a processor 1010, a memory 1020, a communications interface 1030, and a bus 1040.

It should be understood that the communications interface 1030 in the computing device 1000 shown in FIG. 10 may be used for communication with another device.

The processor 1010 may be connected to the memory 1020. The memory 1020 may be configured to store program code and data. Therefore, the memory 1020 may be an internal storage module of the processor 1010, may be an external storage module independent of the processor 1010, or may be a component that includes an internal storage module of the processor 1010 and an external storage module independent of the processor 1010.

The computing device 1000 may further include the bus 1040. The memory 1020 and the communications interface 1030 may be connected to the processor 1010 by using the bus 1040. The bus 1040 may be a peripheral component interconnect (Peripheral Component Interconnect, PCI) bus, an extended industry standard architecture (Extended Industry Standard Architecture, EISA) bus, or the like. The bus 1040 may be classified into an address bus, a data bus, a control bus, and the like. For ease of representation, only one line is used to represent the bus in FIG. 10, but this does not mean that there is only one bus or only one type of bus.

It should be understood that, in this embodiment of the present disclosure, the processor 1010 may be a central processing unit (central processing unit, CPU). The processor may be alternatively a general-purpose processor, a digital signal processor (digital signal processor, DSP), an application-specific integrated circuit (application specific integrated circuit, ASIC), a field programmable gate array (field programmable gate Array, FPGA) or another programmable logical device, a discrete gate or transistor logic device, or a discrete hardware component. The general-purpose processor may be a microprocessor, or the processor may be any conventional processor or the like. Alternatively, the processor 1010 uses one or more integrated circuits to execute a related program, to implement the technical solutions provided in the embodiments of the present disclosure.

The memory 1020 may include a read-only memory and a random access memory, and provide an instruction and data to the processor 1010. A part of the processor 1010 may further include a non-volatile random access memory. For example, the processor 1010 may further store information about a device type.

When the computing device 1000 runs, the processor 1010 executes a computer executable instruction in the memory 1020 to perform the operation steps of the foregoing method.

It should be understood that the computing device 1000 according to this embodiment of the present disclosure may correspond to a corresponding execution body of the method according to the embodiments of the present disclosure, and the foregoing and other operations and/or functions of modules in the computing device 1000 are separately intended to implement corresponding procedures of the methods in the embodiments. For simplicity, details are not described herein again.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing apparatus and method, reference may be made to a corresponding process in the foregoing method embodiments, and details are not described herein again.

In the several embodiments provided in the present disclosure, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, and may be located in one position, or may be distributed on a plurality of network modules. Some or all the modules may be selected based on actual needs to achieve the objectives of the solutions of the embodiments.

In addition, functional modules in the present disclosure may be integrated into one processing module or chip, or each of the modules may exist alone physically, or two or more modules may be integrated into one module.

When the functions are implemented in the form of a software functional module and sold or used as an independent product, the functions may be stored in a computer-readable storage medium. Based on such an understanding, the technical solutions of the present disclosure essentially, or the part contributing to certain embodiments, some of the technical solutions may be implemented in the form of a software product. The computer software product is stored in a storage medium and includes several instructions for instructing a computing device (which may be a personal computer, a server, a network device, or the like) to perform all or some of the steps of the methods described in the embodiments of the present disclosure. The storage medium includes: any medium that can store program code, such as a USB flash drive, a removable hard disk, a read-only memory (Read-Only Memory, ROM), a random access memory (Random Access Memory, RAM), a magnetic disk, or an optical disc.

An embodiment of the present disclosure further provides a computer-readable storage medium, where a computer program is stored on the computer-readable storage medium, and when being executed by a processor, the program is used to perform a method for controlling radar frequency hopping or a radar speed measurement method. The method includes at least one of solutions described in the foregoing embodiments.

The computer storage medium according to this embodiment of the present disclosure may be any combination of one or more computer-readable media. The computer-readable medium may be a computer-readable signal medium or a computer-readable storage medium. The computer-readable storage medium may be but is not limited to an electric, magnetic, optical, electromagnetic, infrared, or semiconductor system, apparatus, or device, or any combination thereof. More specific examples (a non-exhaustive list) of the computer-readable storage medium include an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this document, the computer-readable storage medium may be any tangible medium including or storing a program, and the program may be used by or in combination with an instruction execution system, apparatus, or device.

A computer-readable signal medium may include a data signal propagated in a baseband or as a part of a carrier, where the data signal carries computer-readable program code. Such a propagated data signal may take a variety of forms, including but not limited to an electromagnetic signal, an optical signal, or any suitable combination thereof. The computer-readable signal medium may be alternatively any computer-readable medium other than a computer-readable storage medium, and the computer-readable medium may send, propagate, or transmit a program for use by or in combination with an instruction execution system, apparatus, or device.

The program code included in the computer-readable medium may be transmitted by using any suitable medium, including but not limited to Wi-Fi, a wire, an optical cable, RF, and the like, or any suitable combination thereof.

Computer program code used to perform operations of the present disclosure may be written in one or more programming languages or a combination of the one or more programming languages, and the programming languages include object-oriented programming languages such as Java, Smalltalk, and C++, and further include conventional procedural programming languages such as the "C" language or similar programming languages. The program code may be executed entirely on a user computer, or some may be executed on a user computer as a separate software package, or some may be executed on a user computer while some is executed on a remote computer, or the code may be entirely executed on a remote computer or a server. When a remote computer is involved, the remote computer may be connected to a user computer by using any type of network, including a local area network (LAN) or a wide area network (WAN), or may be connected to an external computer (for example, connected by using an Internet service provider through the Internet).

Figure 11:
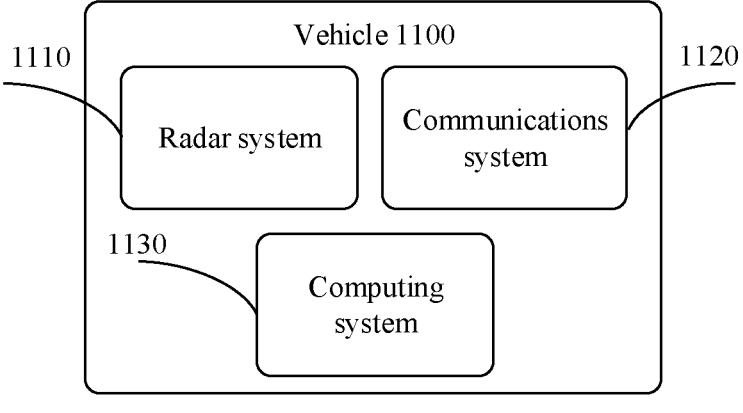
FIG. 11 is an architectural diagram of a vehicle of according to an embodiment of the present disclosure.

FIG. 11 is a structural diagram of a vehicle according to an embodiment of the present disclosure. The vehicle 1100 may be a conventional vehicle or an autonomous vehicle. The autonomous vehicle may also be referred to as an unmanned vehicle, an intelligent driving vehicle, or the like. The autonomous vehicle may drive in a manual mode, a fully autonomous mode, or a partially autonomous mode. When being configured to drive in the fully autonomous mode or the partially autonomous mode, the autonomous vehicle may drive autonomously in a geographic area with little or no control input from a driver.

In addition to common components such as an engine or a motor, a wheel, a steering wheel, and a transmission, the vehicle 1100 further includes a radar system 1110, a communications system 1120, and a computing system 1130.

The radar system 1110 may be but is not limited to the radar 900 in FIG. 9A, and the radar system 1110 may be a system including at least one millimeter wave radar. However, in actual application, a plurality of millimeter wave radars, laser radars, and the like are usually installed on one vehicle to complete automatic operations such as collision avoidance, speed measurement, and ranging, or auxiliary operations during driving.

The communications system 1120 is connected to the radar system 1110, and may communicate wirelessly with one or more apparatuses directly or by using a communications network. For example, the communications system 1120 may use 3rd generation (3G) cellular communication (for example, CDMA, EVD0, or GSM/GPRS), 4th generation (4G) cellular communication (for example, LTE), or 5th generation (5G) cellular communication. For example, the communications system 1120 may communicate with a wireless local area network (WLAN) through Wi-Fi. For example, the communications system 1120 may communicate directly with another device through an infrared link, Bluetooth, or ZigBee.

The computing system 1130 is connected to the communications system 1120. The computing system 1130 may be but is not limited to the control device 612 in FIG. 6 or the computing device 1000 in FIG. 10, and program instructions are stored on the computing system 1130. When the program instructions are activated, the radar system 1110 may be controlled by the communications system 1120 to perform one or all procedures in the foregoing method for controlling radar frequency hopping or the foregoing radar speed measurement method.

In some embodiments, the computing system 1130 may be but is not limited to the foregoing computer storage medium, and program code is stored on the computing system 1130. When the program code is activated, the radar system 1110 may be controlled by the communications system 1120 to perform one or all procedures in the foregoing method for controlling radar frequency hopping or the foregoing radar speed measurement method.

It should be noted that the foregoing are merely example embodiments of the present disclosure and used technical principles. A person skilled in the art may understand that the present disclosure is not limited to specific embodiments described herein, and a person skilled in the art may make various obvious changes, readjustments, and replacements without departing from the protection scope of the present disclosure. Therefore, although the present disclosure is described in detail with reference to the foregoing embodiments, the present disclosure is not limited to the foregoing embodiments. More other equivalent embodiments may be included without departing from the concept of the present disclosure, and all fall within the protection scope of this application.

What is claimed is:

1. A method for controlling radar frequency hopping, comprising:

determining start frequencies of a plurality of frequency-modulated continuous waves (FMCWs) based on a first function such that a difference between the start frequencies of any two adjacent FMCWs in a transmission sequence is greater than a first threshold, wherein the first function is:

$$b_k = \beta + \frac{\alpha - \beta}{k}, k = 1, 2, \ldots M,$$

wherein M is an integer $\geq 2$, wherein $b_k$ is a start frequency of the $k^{th}$ FMCW, k is a sequence number of each FMCW, $\alpha$, $\beta$ are frequency hopping parameters, and M is a quantity of the plurality of FMCWs, and wherein the first threshold is based on a preconfigured rule; and controlling a radar to sequentially transmit the plurality of FMCWs by performing frequency hopping based on the start frequencies.

2. The method of claim 1, wherein the preconfigured rule ensures that the start frequencies can hop up as much as possible to maximize a separation between the start frequencies within an operating bandwidth of the radar.

3. The method of claim 1, wherein the quantity of the plurality of FMCWs is a power of 2.

4. The method of claim 1, wherein values of M, $\alpha$, and $\beta$ in the first function are limited based on the first threshold.

5. The method of claim 1, wherein the plurality of FMCWs constitute one detection subframe, wherein a plurality of detection subframes constitute one detection frame, and wherein the plurality of detection subframes in a detection frame use a same first function to determine the start frequencies of a plurality of FMCWs comprised in each of the plurality of detection subframes.

6. The method of claim 1, further comprising:

detecting an interference signal; and controlling the radar to sequentially transmit the plurality of FMCWs in response to detecting the interference signal.

7. A radar speed measurement method, comprising:

determining start frequencies using a first function such that a difference between the start frequencies of any two adjacent frequency-modulated continuous waves (FMCWs) in a plurality of FMCWs in a transmission sequence is greater than a first threshold, wherein the first function is:

$$b_k = \beta + \frac{\alpha - \beta}{k}, k = 1, 2, \dots M,$$

wherein M is an integer ≥2, wherein $b_k$ is a start frequency of the $k^{th}$ FMCW, k is a sequence number of each FMCW, $\alpha$, $\beta$ are frequency hopping parameters, and M is a quantity of the plurality of FMCWs;

controlling a radar to sequentially transmit the plurality of FMCWs to a target by performing frequency hopping based on the start frequencies;

receiving a reflected signal reflected back by the target in response to the FMCWs; and calculating a relative speed of the target relative to the radar based on the reflected signal.

8. The radar speed measurement method of claim 7, wherein the plurality of FMCWs constitute one detection subframe, wherein a plurality of detection subframes constitute one detection frame, wherein the plurality of detection subframes in a detection frame use a same first function to determine the start frequencies of the plurality of FMCWs comprised in each of the plurality of detection subframes, and wherein the calculating the relative speed comprises:

performing a first fast Fourier transform on first echo intermediate frequency signals corresponding to the plurality of FMCWs in at least one detection subframe to obtain a first speed parameter;

performing a second fast Fourier transform on second echo intermediate frequency signals corresponding to at least one group of a plurality of FMCWs in the detection frame that have a same start frequency to obtain a second speed parameter; and calculating the relative speed based on the first speed parameter and the second speed parameter.

9. The radar speed measurement method of claim 8, wherein the calculating comprises performing equivalent expansion on a second speed measurement range of the second speed parameter; and performing matching calculation on the second speed measurement range and a first speed measurement range of the first speed parameter to obtain the relative speed.

10. The radar speed measurement method of claim 7, wherein the preconfigured rule ensures that the start frequencies can hop up as much as possible to maximize a separation between the start frequencies within an operating bandwidth of the radar.

11. The radar speed measurement method of claim 7, wherein the quantity of the plurality of FMCWs is a power of 2.

12. The radar speed measurement method of claim 7, wherein values of M, $\alpha$, and $\beta$ in the first function are limited based on the first threshold.

13. The radar speed measurement method of claim 7, further comprising performing the frequency hopping based on the start frequencies when an interference signal is detected.

14. A radar comprising:

a memory configured to store instructions; and a processor coupled to the memory and configured to execute the instructions to cause the radar to:

sequentially transmit a plurality of frequency-modulated continuous waves (FMCWs) to a target by performing frequency hopping based on start frequencies determined using a first function such that a difference between the start frequencies of any two adjacent FMCWs in a transmission sequence is greater than a first threshold, wherein the first function is:

$$b_k = \beta + \frac{\alpha - \beta}{k}, k = 1, 2, \dots M,$$

wherein M is an integer ≥2, wherein $b_k$ is a start frequency of the $k^{th}$ FMCW, k is a sequence number of each FMCW, $\alpha$, $\beta$ are frequency hopping parameters, and M is a quantity of the plurality of FMCWs, and wherein the first threshold is based on a preconfigured rule;

receive a reflected signal reflected back from the target; and calculate a relative speed of the target relative to the radar based on the reflected signal.

15. The radar of claim 14, wherein the plurality of FMCWs constitute one detection subframe, and a plurality of detection subframes constitute one detection frame, wherein the plurality of detection subframes in a detection frame use a same first function to determine the start frequencies of the plurality of FMCWs comprised in each of the plurality of detection subframes, and wherein the processor is further configured to execute the instructions to cause the radar to:

perform a first fast Fourier transform on first echo intermediate frequency signals corresponding to the plurality of FMCWs in at least one detection subframe to obtain a first speed parameter;

perform a second fast Fourier transform on second echo intermediate frequency signals corresponding to at least one group of a plurality of FMCWs in the detection frame that have a same start frequency to obtain a second speed parameter; and calculate the relative speed based on the first speed parameter and the second speed parameter.

16. The radar of claim 15, wherein the processor is further configured to execute the instructions to cause the radar to perform equivalent expansion on a second speed measurement range of the second speed parameter, and perform matching calculation on the second speed measurement range and a first speed measurement range of the first speed parameter to obtain the relative speed.

17. The radar of claim 14, wherein the preconfigured rule ensures that the start frequencies can hop up as much as possible to maximize a separation between the start frequencies within an operating bandwidth of the radar.

18. The radar of claim 14, wherein the quantity of the plurality of FMCWs is a power of 2.

19. The radar of claim 14, wherein values of M, α, and β in the first function are limited based on the first threshold.

20. The radar of claim 14, wherein the processor is further configured to execute the instructions to cause the radar to perform the frequency hopping based on the start frequencies when an interference signal is detected.

\*  \*  \*  \*  \*